US008589486B2

(12) United States Patent
Martinez et al.

(10) Patent No.: US 8,589,486 B2
(45) Date of Patent: Nov. 19, 2013

(54) SYSTEM AND METHOD FOR ADDRESSING COMMUNICATIONS

(75) Inventors: Ronald Martinez, San Francisco, CA (US); Marc Eliot Davis, San Francisco, CA (US); Christopher William Higgins, Portland, OR (US); Joseph James O'Sullivan, Oakland, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1038 days.

(21) Appl. No.: 12/057,878

(22) Filed: Mar. 28, 2008

(65) Prior Publication Data
US 2009/0248694 A1    Oct. 1, 2009

(51) Int. Cl.
G06F 15/16    (2006.01)
G06F 15/173    (2006.01)

(52) U.S. Cl.
USPC .......................................... 709/204; 709/206

(58) Field of Classification Search
USPC ....................................................... 709/204
See application file for complete search history.

(56) References Cited

U.S. PATENT DOCUMENTS

| | | |
|---|---|---|
| 5,446,891 A | 8/1995 | Kaplan et al. |
| 5,493,692 A | 2/1996 | Theimer et al. |
| 5,583,763 A | 12/1996 | Atcheson et al. |
| 5,651,068 A | 7/1997 | Klemba et al. |
| 5,761,662 A | 6/1998 | Dasan |
| 5,764,906 A * | 6/1998 | Edelstein et al. ............ 709/219 |
| 5,781,879 A | 7/1998 | Arnold et al. |
| 5,784,365 A | 7/1998 | Ikeda |
| 5,794,210 A | 8/1998 | Goldhaber et al. |
| 5,802,510 A * | 9/1998 | Jones .................................. 1/1 |
| 5,835,087 A | 11/1998 | Herz |
| 5,903,848 A | 5/1999 | Takahashi |
| 5,920,854 A | 7/1999 | Kirsch et al. |
| 6,014,638 A | 1/2000 | Burge et al. |
| 6,021,403 A | 2/2000 | Horvitz et al. |
| 6,047,234 A | 4/2000 | Cherveny et al. |
| 6,098,065 A | 8/2000 | Skillen et al. |
| 6,112,181 A | 8/2000 | Shear et al. |
| 6,157,924 A | 12/2000 | Austin |

(Continued)

FOREIGN PATENT DOCUMENTS

| | | |
|---|---|---|
| EP | 1362302 | 11/2003 |
| JP | 2002312559 | 10/2002 |

(Continued)

OTHER PUBLICATIONS

U.S. Appl. No. 12/273,259, filed Dec. 6, 2007, Davis.

(Continued)

Primary Examiner — Joseph Avellino
Assistant Examiner — James Baron
(74) Attorney, Agent, or Firm — James J. DeCarlo; Greenberg Traurig, LLP

(57) ABSTRACT

The disclosure describes systems and methods for utilizing data collected and stored on multiple devices in order to improve the performance of the network via a markup language for addressing and delivering communications. The markup language invokes W4COMN operations through a free-form, natural language syntax which enables completely personalized user-defined designations for real-world entities (RWEs) or information objections (IOs) utilizing names or functional tags. Desired network operations including addressing network resources, entities or users are activated when the markup language is augmented via processing with W4 contextual data into an actual W4COMN circuit, process or event.

17 Claims, 8 Drawing Sheets

(56) References Cited

U.S. PATENT DOCUMENTS

| | | |
|---|---|---|
| 6,169,992 B1 | 1/2001 | Beall et al. |
| 6,212,552 B1 * | 4/2001 | Biliris et al. ............... 709/206 |
| 6,266,667 B1 | 7/2001 | Olsson |
| 6,314,365 B1 | 11/2001 | Smith |
| 6,314,399 B1 * | 11/2001 | Deligne et al. ............. 704/257 |
| 6,324,519 B1 | 11/2001 | Eldering |
| 6,327,590 B1 | 12/2001 | Chidlovskii et al. |
| 6,438,608 B2 * | 8/2002 | Biliris et al. ............... 709/245 |
| 6,446,065 B1 | 9/2002 | Nishioka et al. |
| 6,490,698 B1 | 12/2002 | Horvitz et al. |
| 6,502,033 B1 | 12/2002 | Phuyal |
| 6,523,172 B1 | 2/2003 | Martinez-Guerra et al. |
| 6,571,279 B1 | 5/2003 | Herz et al. |
| 6,601,012 B1 | 7/2003 | Horvitz et al. |
| 6,662,195 B1 | 12/2003 | Langseth et al. |
| 6,665,640 B1 | 12/2003 | Bennett et al. |
| 6,694,316 B1 | 2/2004 | Langseth et al. |
| 6,701,311 B2 | 3/2004 | Biebesheimer et al. |
| 6,701,315 B1 | 3/2004 | Austin |
| 6,708,203 B1 | 3/2004 | Maker et al. |
| 6,731,940 B1 | 5/2004 | Nagendran |
| 6,741,980 B1 | 5/2004 | Langseth et al. |
| 6,757,661 B1 | 6/2004 | Blaser et al. |
| 6,773,344 B1 | 8/2004 | Gabai et al. |
| 6,781,920 B2 | 8/2004 | Bates et al. |
| 6,785,670 B1 | 8/2004 | Chiang et al. |
| 6,789,073 B1 | 9/2004 | Lunenfeld |
| 6,813,501 B2 | 11/2004 | Kinnunen et al. |
| 6,816,850 B2 | 11/2004 | Culliss |
| 6,829,333 B1 | 12/2004 | Frazier |
| 6,834,195 B2 | 12/2004 | Brandenberg et al. |
| 6,842,761 B2 | 1/2005 | Diamond et al. |
| 6,845,370 B2 | 1/2005 | Burkey et al. |
| 6,850,252 B1 | 2/2005 | Hoffberg |
| 6,853,913 B2 | 2/2005 | Cherveny et al. |
| 6,853,982 B2 | 2/2005 | Smith et al. |
| 6,882,977 B1 | 4/2005 | Miller |
| 6,904,160 B2 | 6/2005 | Burgess |
| 6,931,254 B1 | 8/2005 | Egner et al. |
| 6,961,660 B2 | 11/2005 | Underbrink et al. |
| 6,961,731 B2 | 11/2005 | Holbrook |
| 6,985,839 B1 | 1/2006 | Motamedi et al. |
| 7,010,492 B1 | 3/2006 | Bassett et al. |
| 7,027,801 B1 | 4/2006 | Hall et al. |
| 7,058,508 B2 | 6/2006 | Combs et al. |
| 7,058,626 B1 | 6/2006 | Pan et al. |
| 7,062,510 B1 | 6/2006 | Eldering |
| 7,065,345 B2 | 6/2006 | Carlton et al. |
| 7,065,483 B2 * | 6/2006 | Decary et al. ............... 704/7 |
| 7,069,308 B2 | 6/2006 | Abrams |
| 7,073,129 B1 | 7/2006 | Robarts et al. |
| 7,110,776 B2 | 9/2006 | Sambin |
| 7,143,091 B2 | 11/2006 | Charnock et al. |
| 7,149,696 B2 | 12/2006 | Shimizu et al. |
| 7,181,438 B1 | 2/2007 | Szabo |
| 7,185,286 B2 | 2/2007 | Zondervan |
| 7,194,512 B1 | 3/2007 | Creemer et al. |
| 7,203,597 B2 | 4/2007 | Sato et al. |
| 7,209,915 B1 | 4/2007 | Taboada et al. |
| 7,219,013 B1 | 5/2007 | Young et al. |
| 7,236,969 B1 | 6/2007 | Skillen et al. |
| 7,254,581 B2 | 8/2007 | Johnson et al. |
| 7,257,570 B2 | 8/2007 | Riise et al. |
| 2,273,259 A1 | 12/2007 | Davis |
| 7,305,445 B2 | 12/2007 | Singh et al. |
| 7,320,025 B1 | 1/2008 | Steinberg et al. |
| 7,343,364 B2 | 3/2008 | Bram et al. |
| 7,395,507 B2 | 7/2008 | Robarts et al. |
| 7,404,084 B2 | 7/2008 | Fransdonk |
| 7,437,312 B2 | 10/2008 | Bhatia et al. |
| 7,451,102 B2 | 11/2008 | Nowak |
| 7,461,168 B1 | 12/2008 | Wan |
| 7,496,548 B1 | 2/2009 | Ershov |
| 7,522,995 B2 | 4/2009 | Nortrup |
| 7,529,811 B2 * | 5/2009 | Thompson ............... 709/219 |
| 7,562,122 B2 * | 7/2009 | Oliver et al. ............... 709/206 |
| 7,577,665 B2 | 8/2009 | Rameer et al. |
| 7,584,215 B2 | 9/2009 | Saari et al. |
| 7,624,104 B2 | 11/2009 | Berkhin et al. |
| 7,624,146 B1 | 11/2009 | Brogne et al. |
| 7,634,465 B2 | 12/2009 | Sareen et al. |
| 7,657,907 B2 | 2/2010 | Fennan et al. |
| 7,681,147 B2 | 3/2010 | Richardson-Bunbury et al. |
| 7,725,492 B2 * | 5/2010 | Sittig et al. ............... 707/784 |
| 7,729,901 B2 | 6/2010 | Richardson-Bunbury et al. |
| 7,769,740 B2 | 8/2010 | Martinez |
| 7,769,745 B2 | 8/2010 | Mor Naaman |
| 7,783,622 B1 | 8/2010 | Vandermolen et al. |
| 7,792,040 B2 | 9/2010 | Nair |
| 7,802,724 B1 | 9/2010 | Nohr |
| 7,822,871 B2 | 10/2010 | Stolorz et al. |
| 7,831,586 B2 | 11/2010 | Reitter et al. |
| 7,865,308 B2 | 1/2011 | Athsani |
| 7,925,708 B2 | 4/2011 | Davis |
| 2001/0013009 A1 | 8/2001 | Greening et al. |
| 2001/0035880 A1 | 11/2001 | Musatov et al. |
| 2001/0047384 A1 | 11/2001 | Croy |
| 2001/0052058 A1 | 12/2001 | Ohran |
| 2002/0014742 A1 | 2/2002 | Conte et al. |
| 2002/0019849 A1 | 2/2002 | Tuvey et al. |
| 2002/0019857 A1 | 2/2002 | Harjanto |
| 2002/0023091 A1 | 2/2002 | Silberberg et al. |
| 2002/0023230 A1 | 2/2002 | Bolnick et al. |
| 2002/0035605 A1 | 3/2002 | McDowell et al. |
| 2002/0049968 A1 | 4/2002 | Wilson et al. |
| 2002/0052785 A1 | 5/2002 | Smith et al. |
| 2002/0052786 A1 | 5/2002 | Kim et al. |
| 2002/0054089 A1 | 5/2002 | Nicholas |
| 2002/0065844 A1 | 5/2002 | Robinson et al. |
| 2002/0069218 A1 | 6/2002 | Sull et al. |
| 2002/0099695 A1 | 7/2002 | Abaijian et al. |
| 2002/0103870 A1 * | 8/2002 | Shouji ............... 709/206 |
| 2002/0111956 A1 | 8/2002 | Yeo et al. |
| 2002/0112035 A1 | 8/2002 | Carey |
| 2002/0133400 A1 | 9/2002 | Terry et al. |
| 2002/0138331 A1 | 9/2002 | Hosea et al. |
| 2002/0152267 A1 | 10/2002 | Lennon |
| 2002/0169840 A1 * | 11/2002 | Sheldon et al. ............... 709/206 |
| 2002/0173971 A1 | 11/2002 | Stirpe et al. |
| 2002/0178161 A1 * | 11/2002 | Brezin et al. ............... 707/10 |
| 2002/0198786 A1 | 12/2002 | Tripp et al. |
| 2003/0008661 A1 | 1/2003 | Joyce et al. |
| 2003/0009367 A1 | 1/2003 | Morrison |
| 2003/0009495 A1 | 1/2003 | Adjaoute |
| 2003/0027558 A1 | 2/2003 | Eisinger |
| 2003/0032409 A1 | 2/2003 | Hutcheson et al. |
| 2003/0033331 A1 | 2/2003 | Sena et al. |
| 2003/0033394 A1 | 2/2003 | Stine et al. |
| 2003/0065762 A1 | 4/2003 | Stolorz et al. |
| 2003/0069877 A1 | 4/2003 | Grefenstette et al. |
| 2003/0069880 A1 | 4/2003 | Harrison et al. |
| 2003/0078978 A1 | 4/2003 | Lardin et al. |
| 2003/0080992 A1 | 5/2003 | Haines |
| 2003/0126250 A1 * | 7/2003 | Jhanji ............... 709/223 |
| 2003/0149574 A1 | 8/2003 | Rudman |
| 2003/0154293 A1 | 8/2003 | Zmolek |
| 2003/0165241 A1 | 9/2003 | Fransdonk |
| 2003/0191816 A1 | 10/2003 | Landress et al. |
| 2004/0010492 A1 | 1/2004 | Zhao et al. |
| 2004/0015588 A1 | 1/2004 | Cotte |
| 2004/0030798 A1 | 2/2004 | Andersson et al. |
| 2004/0034752 A1 | 2/2004 | Ohran |
| 2004/0043758 A1 | 3/2004 | Sorvari et al. |
| 2004/0044736 A1 | 3/2004 | Austin-Lane et al. |
| 2004/0070602 A1 | 4/2004 | Kobuya et al. |
| 2004/0139025 A1 | 7/2004 | Coleman |
| 2004/0139047 A1 | 7/2004 | Rechsteiner |
| 2004/0148341 A1 | 7/2004 | Cotte |
| 2004/0152477 A1 * | 8/2004 | Wu et al. ............... 455/466 |
| 2004/0183829 A1 | 9/2004 | Kontny et al. |
| 2004/0201683 A1 | 10/2004 | Murashita et al. |
| 2004/0203851 A1 | 10/2004 | Vetro et al. |
| 2004/0203909 A1 | 10/2004 | Koster |
| 2004/0209602 A1 | 10/2004 | Joyce et al. |

(56) References Cited

U.S. PATENT DOCUMENTS

| | | |
|---|---|---|
| 2004/0243623 A1 | 12/2004 | Ozer et al. |
| 2004/0260804 A1 | 12/2004 | Grabarnik et al. |
| 2004/0267880 A1 | 12/2004 | Patiejunas |
| 2005/0005242 A1 | 1/2005 | Hoyle |
| 2005/0015451 A1* | 1/2005 | Sheldon et al. ............... 709/206 |
| 2005/0015599 A1 | 1/2005 | Wang et al. |
| 2005/0050027 A1 | 3/2005 | Yeh |
| 2005/0050043 A1 | 3/2005 | Pyhalammi et al. |
| 2005/0055321 A1 | 3/2005 | Fratkina |
| 2005/0060381 A1 | 3/2005 | Huynh et al. |
| 2005/0065950 A1 | 3/2005 | Chaganti et al. |
| 2005/0065980 A1* | 3/2005 | Hyatt et al. ................. 707/104.1 |
| 2005/0076060 A1 | 4/2005 | Finn et al. |
| 2005/0086187 A1 | 4/2005 | Grosser et al. |
| 2005/0105552 A1 | 5/2005 | Osterling |
| 2005/0108213 A1 | 5/2005 | Riise et al. |
| 2005/0120006 A1 | 6/2005 | Nye |
| 2005/0131727 A1 | 6/2005 | Sezan |
| 2005/0149397 A1 | 7/2005 | Morgernstern et al. |
| 2005/0151849 A1 | 7/2005 | Fitzhugh et al. |
| 2005/0159220 A1 | 7/2005 | Wilson et al. |
| 2005/0159970 A1 | 7/2005 | Buyukkokten et al. |
| 2005/0160080 A1 | 7/2005 | Dawson |
| 2005/0165699 A1 | 7/2005 | Hahn-Carlson |
| 2005/0166240 A1 | 7/2005 | Kim |
| 2005/0171955 A1 | 8/2005 | Hull et al. |
| 2005/0177385 A1 | 8/2005 | Hull et al. |
| 2005/0182824 A1 | 8/2005 | Cotte |
| 2005/0183110 A1 | 8/2005 | Anderson |
| 2005/0187786 A1 | 8/2005 | Tsai |
| 2005/0192025 A1 | 9/2005 | Kaplan |
| 2005/0203801 A1 | 9/2005 | Morgenstern et al. |
| 2005/0216295 A1 | 9/2005 | Abrahamsohn |
| 2005/0216300 A1 | 9/2005 | Appelman et al. |
| 2005/0219375 A1 | 10/2005 | Hasegawa et al. |
| 2005/0234781 A1 | 10/2005 | Morgenstern |
| 2005/0273510 A1 | 12/2005 | Schuh |
| 2006/0020631 A1 | 1/2006 | Cheong Wan et al. |
| 2006/0026013 A1 | 2/2006 | Kraft |
| 2006/0026067 A1 | 2/2006 | Nicholas et al. |
| 2006/0031108 A1 | 2/2006 | Oran |
| 2006/0040719 A1 | 2/2006 | Plimi |
| 2006/0047563 A1 | 3/2006 | Wardell |
| 2006/0047615 A1 | 3/2006 | Ravin |
| 2006/0053058 A1 | 3/2006 | Hotchkiss et al. |
| 2006/0069612 A1 | 3/2006 | Hurt et al. |
| 2006/0069616 A1 | 3/2006 | Bau |
| 2006/0069749 A1 | 3/2006 | Herz et al. |
| 2006/0074853 A1 | 4/2006 | Liu et al. |
| 2006/0085392 A1 | 4/2006 | Wang et al. |
| 2006/0085419 A1 | 4/2006 | Rosen |
| 2006/0089876 A1 | 4/2006 | Boys |
| 2006/0116924 A1 | 6/2006 | Angeles et al. |
| 2006/0123053 A1 | 6/2006 | Scannell, Jr. |
| 2006/0129313 A1 | 6/2006 | Becker |
| 2006/0129605 A1* | 6/2006 | Doshi ........................ 707/104.1 |
| 2006/0161894 A1 | 7/2006 | Oustiougov et al. |
| 2006/0168591 A1 | 7/2006 | Hunsinger et al. |
| 2006/0173838 A1 | 8/2006 | Garg et al. |
| 2006/0173985 A1 | 8/2006 | Moore |
| 2006/0178822 A1 | 8/2006 | Lee |
| 2006/0184508 A1 | 8/2006 | Fuselier et al. |
| 2006/0184579 A1 | 8/2006 | Mills |
| 2006/0212330 A1 | 9/2006 | Savilampi |
| 2006/0212401 A1 | 9/2006 | Amerally et al. |
| 2006/0227945 A1 | 10/2006 | Runge et al. |
| 2006/0235816 A1 | 10/2006 | Yang et al. |
| 2006/0236257 A1 | 10/2006 | Othmer et al. |
| 2006/0242139 A1 | 10/2006 | Butterfield et al. |
| 2006/0242178 A1 | 10/2006 | Butterfield et al. |
| 2006/0242259 A1 | 10/2006 | Vallath et al. |
| 2006/0258368 A1 | 11/2006 | Granito et al. |
| 2006/0282455 A1 | 12/2006 | Lee |
| 2007/0013560 A1 | 1/2007 | Casey |
| 2007/0015519 A1 | 1/2007 | Casey |
| 2007/0043766 A1 | 2/2007 | Nicholas et al. |
| 2007/0067104 A1 | 3/2007 | Mays |
| 2007/0067267 A1 | 3/2007 | Ives |
| 2007/0072591 A1 | 3/2007 | McGary et al. |
| 2007/0073583 A1 | 3/2007 | Grouf et al. |
| 2007/0073641 A1 | 3/2007 | Perry et al. |
| 2007/0086061 A1 | 4/2007 | Robbins |
| 2007/0087756 A1 | 4/2007 | Hoffberg |
| 2007/0088852 A1 | 4/2007 | Levkovitz |
| 2007/0100956 A1 | 5/2007 | Kumar |
| 2007/0112762 A1 | 5/2007 | Brubaker |
| 2007/0121843 A1 | 5/2007 | Atazky et al. |
| 2007/0130137 A1 | 6/2007 | Oliver et al. |
| 2007/0136048 A1 | 6/2007 | Richardson-Bunbury et al. |
| 2007/0136235 A1 | 6/2007 | Hess |
| 2007/0136256 A1 | 6/2007 | Kapur et al. |
| 2007/0136689 A1 | 6/2007 | Richardson-Bunbury et al. |
| 2007/0143345 A1 | 6/2007 | Jones et al. |
| 2007/0150168 A1 | 6/2007 | Balcom et al. |
| 2007/0150359 A1 | 6/2007 | Lim et al. |
| 2007/0155411 A1 | 7/2007 | Morrison |
| 2007/0161382 A1 | 7/2007 | Melinger et al. |
| 2007/0162850 A1 | 7/2007 | Adler |
| 2007/0168430 A1 | 7/2007 | Brun et al. |
| 2007/0173266 A1 | 7/2007 | Barnes |
| 2007/0179792 A1 | 8/2007 | Kramer |
| 2007/0185599 A1 | 8/2007 | Robinson et al. |
| 2007/0192299 A1* | 8/2007 | Zuckerberg et al. ............... 707/3 |
| 2007/0198506 A1 | 8/2007 | Attaran Rezaei et al. |
| 2007/0198563 A1 | 8/2007 | Apparao et al. |
| 2007/0203591 A1 | 8/2007 | Bowerman |
| 2007/0219708 A1 | 9/2007 | Brasche et al. |
| 2007/0233585 A1 | 10/2007 | Ben Simon et al. |
| 2007/0239348 A1 | 10/2007 | Cheung |
| 2007/0239517 A1 | 10/2007 | Chung et al. |
| 2007/0259653 A1 | 11/2007 | Tang et al. |
| 2007/0260508 A1 | 11/2007 | Barry et al. |
| 2007/0260604 A1 | 11/2007 | Haeuser et al. |
| 2007/0271297 A1 | 11/2007 | Jaffe et al. |
| 2007/0271340 A1 | 11/2007 | Goodman et al. |
| 2007/0273758 A1 | 11/2007 | Mendoza et al. |
| 2007/0276940 A1 | 11/2007 | Abraham et al. |
| 2007/0282621 A1* | 12/2007 | Altman et al. ..................... 705/1 |
| 2007/0282675 A1 | 12/2007 | Varghese |
| 2007/0288278 A1 | 12/2007 | Alexander et al. |
| 2008/0005313 A1 | 1/2008 | Flake et al. |
| 2008/0005651 A1 | 1/2008 | Grefenstette et al. |
| 2008/0010206 A1 | 1/2008 | Coleman |
| 2008/0021957 A1 | 1/2008 | Medved et al. |
| 2008/0026804 A1 | 1/2008 | Baray et al. |
| 2008/0028031 A1 | 1/2008 | Bailey et al. |
| 2008/0040283 A1 | 2/2008 | Morris |
| 2008/0046298 A1 | 2/2008 | Ben-Yehuda et al. |
| 2008/0070588 A1 | 3/2008 | Morin |
| 2008/0086356 A1 | 4/2008 | Glassman et al. |
| 2008/0086431 A1 | 4/2008 | Robinson et al. |
| 2008/0091796 A1 | 4/2008 | Story et al. |
| 2008/0096664 A1 | 4/2008 | Baray et al. |
| 2008/0102911 A1 | 5/2008 | Campbell et al. |
| 2008/0104061 A1 | 5/2008 | Rezaei |
| 2008/0104227 A1 | 5/2008 | Birnie et al. |
| 2008/0109761 A1 | 5/2008 | Stambaugh |
| 2008/0109843 A1 | 5/2008 | Ullah |
| 2008/0114751 A1 | 5/2008 | Cramer et al. |
| 2008/0120183 A1 | 5/2008 | Park |
| 2008/0120308 A1 | 5/2008 | Martinez et al. |
| 2008/0120690 A1 | 5/2008 | Norlander et al. |
| 2008/0133750 A1 | 6/2008 | Grabarnik et al. |
| 2008/0147655 A1 | 6/2008 | Sinha et al. |
| 2008/0147743 A1 | 6/2008 | Taylor et al. |
| 2008/0148175 A1 | 6/2008 | Naaman et al. |
| 2008/0154720 A1 | 6/2008 | Gounares |
| 2008/0163284 A1 | 7/2008 | Martinez et al. |
| 2008/0172632 A1 | 7/2008 | Stambaugh |
| 2008/0177706 A1 | 7/2008 | Yuen |
| 2008/0270579 A1 | 10/2008 | Herz et al. |
| 2008/0285886 A1 | 11/2008 | Allen |
| 2008/0300250 A1 | 12/2008 | Hardy et al. |
| 2008/0320001 A1 | 12/2008 | Gaddam |

(56) References Cited

U.S. PATENT DOCUMENTS

| | | | |
|---|---|---|---|
| 2009/0005987 A1 | 1/2009 | Vengroff et al. | |
| 2009/0006336 A1 | 1/2009 | Forstall et al. | |
| 2009/0012934 A1 | 1/2009 | Yerigan | |
| 2009/0012965 A1 | 1/2009 | Franken | |
| 2009/0043844 A1* | 2/2009 | Zimmet et al. | 709/204 |
| 2009/0044132 A1 | 2/2009 | Combel et al. | |
| 2009/0063254 A1 | 3/2009 | Paul et al. | |
| 2009/0070186 A1 | 3/2009 | Buiten et al. | |
| 2009/0073191 A1 | 3/2009 | Smith et al. | |
| 2009/0076889 A1 | 3/2009 | Jhanji | |
| 2009/0100052 A1 | 4/2009 | Stern et al. | |
| 2009/0106356 A1 | 4/2009 | Brase et al. | |
| 2009/0125517 A1 | 5/2009 | Krishnaswamy et al. | |
| 2009/0132941 A1 | 5/2009 | Pilskalns et al. | |
| 2009/0144141 A1 | 6/2009 | Dominowska et al. | |
| 2009/0150501 A1 | 6/2009 | Davis et al. | |
| 2009/0150507 A1 | 6/2009 | Davis et al. | |
| 2009/0165051 A1 | 6/2009 | Armaly | |
| 2009/0171939 A1 | 7/2009 | Athsani et al. | |
| 2009/0177603 A1 | 7/2009 | Honisch | |
| 2009/0187637 A1* | 7/2009 | Wu et al. | 709/206 |
| 2009/0204484 A1 | 8/2009 | Johnson | |
| 2009/0204672 A1 | 8/2009 | Jetha et al. | |
| 2009/0204676 A1* | 8/2009 | Parkinson et al. | 709/206 |
| 2009/0216606 A1 | 8/2009 | Coffman et al. | |
| 2009/0222302 A1 | 9/2009 | Higgins | |
| 2009/0222303 A1 | 9/2009 | Higgins | |
| 2009/0234814 A1 | 9/2009 | Boerries et al. | |
| 2009/0234909 A1 | 9/2009 | Strandeil et al. | |
| 2009/0249482 A1 | 10/2009 | Sarathy | |
| 2009/0265431 A1* | 10/2009 | Jania et al. | 709/206 |
| 2009/0281997 A1 | 11/2009 | Jain | |
| 2009/0299837 A1 | 12/2009 | Steelberg et al. | |
| 2009/0313546 A1 | 12/2009 | Katpelly et al. | |
| 2009/0320047 A1 | 12/2009 | Khan et al. | |
| 2009/0323519 A1 | 12/2009 | Pun | |
| 2009/0328087 A1 | 12/2009 | Higgins et al. | |
| 2010/0002635 A1 | 1/2010 | Eklund | |
| 2010/0014444 A1 | 1/2010 | Ghanadan et al. | |
| 2010/0063993 A1 | 3/2010 | Higgins et al. | |
| 2010/0070368 A1 | 3/2010 | Choi et al. | |
| 2010/0118025 A1 | 5/2010 | Smith et al. | |
| 2010/0125563 A1 | 5/2010 | Nair et al. | |
| 2010/0125569 A1 | 5/2010 | Nair et al. | |
| 2010/0125604 A1 | 5/2010 | Martinez et al. | |
| 2010/0125605 A1 | 5/2010 | Nair et al. | |
| 2010/0185642 A1 | 7/2010 | Higgins et al. | |

FOREIGN PATENT DOCUMENTS

| | | |
|---|---|---|
| KR | 1020000036897 | 7/2000 |
| KR | 1020000054319 | 9/2000 |
| KR | 10-2000-0064105 | 11/2000 |
| KR | 1020030049173 | 6/2003 |
| KR | 10-0801662 | 2/2005 |
| KR | 1020060043333 | 5/2006 |
| KR | 102007034094 | 3/2007 |
| KR | 1020070073180 | 7/2007 |
| KR | 1020080048802 | 6/2008 |
| WO | WO2006/116196 | 11/2006 |
| WO | WO 2007/022137 | 2/2007 |
| WO | WO 2007/027453 | 3/2007 |
| WO | WO 2007070358 | 6/2007 |
| WO | WO2007113546 | 10/2007 |

OTHER PUBLICATIONS

U.S. Appl. No. 11/958,157, filed Dec. 17, 2007, Hayashi.
U.S. Appl. No. 11/952,875, filed Dec. 7, 2007, Davis.
U.S. Appl. No. 11/960,368, filed Dec. 19, 2007, Madsen.
U.S. Appl. No. 11/952,007, filed Dec. 6, 2007, Davis.
U.S. Appl. No. 11/953,454, filed Dec. 10, 2007, Davis.
U.S. Appl. No. 11/953,494, filed Dec. 10, 2007, Davis.
U.S. Appl. No. 12/059,594, filed Mar. 31, 2008, Martinez.
U.S. Appl. No. 12/236,668, filed Sep. 24, 2008, Davis.
U.S. Appl. No. 12/057,943, filed Mar. 28, 2008, Martinez.
U.S. Appl. No. 11/969,751, filed Jan. 4, 2008, Martinez.
U.S. Appl. No. 12/145,145, filed Jun. 24, 2008, Davis.
U.S. Appl. No. 12/163,249, filed Jun. 27, 2008, Kalaboukis.
U.S. Appl. No. 12/182,969, filed Jul. 30, 2008, Higgins.
U.S. Appl. No. 12/182,813, filed Jul. 30, 2008, Higgins.
U.S. Appl. No. 12/163,314, filed Jun. 27, 2008, Higgins.
U.S. Appl. No. 12/163,396, filed Jun. 27, 2008, Higgins.
U.S. Appl. No. 12/195,969, filed Aug. 21, 2008, Martinez.
U.S. Appl. No. 12/234,000, filed Sep. 19, 2008, Martinez.
U.S. Appl. No. 12/241,590, filed Sep. 30, 2008, Athsani.
U.S. Appl. No. 12/241,687, filed Sep. 30, 2008, Davis.
U.S. Appl. No. 12/206,172, filed Sep. 8, 2008, Higgins.
U.S. Appl. No. 12/273,291, filed Nov. 18, 2008, Nair.
U.S. Appl. No. 12/273,317, filed Nov. 18, 2008, Nair.
U.S. Appl. No. 12/273,345, filed Nov. 18, 2008, Nair.
U.S. Appl. No. 12/273,371, filed Nov. 18, 2008, Nair.
U.S. Appl. No. 12/241,198, filed Sep. 30, 2008, Higgins.
U.S. Appl. No. 12/339,355, filed Dec. 19, 2008, Higgins.
U.S. Appl. No. 12/329,038, filed Dec. 5, 2008, Higgins.
U.S. Appl. No. 12/326,553, filed Dec. 2, 2008, Churchill.
U.S. Appl. No. 12/242,656, filed Sep. 30, 2008, Burgener.
U.S. Appl. No. 12/357,311, filed Jan. 21, 2009, Higgins.
U.S. Appl. No. 12/357,332, filed Jan. 21, 2009, Higgins.
U.S. Appl. No. 12/357,345, filed Jan. 21, 2009, Higgins.
U.S. Appl. No. 12/357,285, filed Jan. 21, 2009, Higgins.
U.S. Appl. No. 11/617,451, filed Dec. 28, 2006, Kalaboukis.
U.S. Appl. No. 11/562,973, filed Nov. 22, 2006, Martinez.
U.S. Appl. No. 11/562,974, filed Nov. 22, 2006, Martinez.
U.S. Appl. No. 11/562,976, filed Nov. 22, 2006, Martinez.
U.S. Appl. No. 11/562,979, filed Nov. 22, 2006, Martinez.
U.S. Appl. No. 12/237,709, filed Sep. 25, 2008, Martinez.
U.S. Appl. No. 12/399,669, filed Mar. 6, 2009, King.
U.S. Appl. No. 11/353,657, filed Feb. 13, 2006, Mor Naaman.
U.S. Appl. No. 11/437,344, filed May 19, 2006, Jaffe.
U.S. Appl. No. 11/593,869, filed Nov. 6, 2006, Mor Naaman.
U.S. Appl. No. 11/593,668, filed Nov. 6, 2006, Mor Naaman.
Allen James F., "Maintaining Knowledge About Temporal Intervals", Communications of the ACM, Nov. 1983, vol. 26, No. 11 pp. 832-843; 12 pages.
Press Release, "QUALCOMM Conducts First Live Demonstration of FL Technology on a Wireless Handset", Qualcomm Inc., San Diego, Sep. 27, 2005; 3 pages.
MediaFlo, FLO Technology Overview, Qualcomm Inc. Copyright 2007; 24 pages.
Axup, Jeff et al., "Conceptualizing New Mobile Devices by Observing Gossip and Social Network Formation Amongst the Extremely Mobile", ITEE Technical Report #459, Dec. 19, 2005, pp. 1-71.
Conhaim, Wallys W., "Social networks: the Internet continues to evolve: where is the money in all this? That is what venture capitalists are asking. (Perspectives)", Information Today, 22, 9, 35(2), Oct. 2005, (pp. 1-5 of attached).
Davis, Marc et al., "From Context to Content: Leveraging Context to Infer Media Metadata", ACM Press, Oct. 10, 2004, pp. 1-8.
Kaasinen, E., "Behaviour & Information Technology", Taylor & Francis, vol. 24, No. 1, Jan./Feb. 2005, pp. 37-49, (Abstract only attached).
Konomi, Shin'ichi et al., "Supporting Colocated Interactions Using RFID and Social Network Displays", Pervasive Computing, Jul.-Sep. 2006 , vol. 5, No. 3, pp. 48-56 (pp. 1-4 of attached).
Lin, F. et al., "A unified framework for managing Web-based services.", Information Systems and e-Business Management, vol. 3, Oct. 2005, p. 299, (pp. 1-15 of attached).
Metz, Cade, "MySpace Nation", PC Magazine, Jun. 21, 2006, pp. 1-10 attached.
Perkowitz, Mike et al., "Utilizing Online Communities to Facilitate Physical World Interactions", The International Conference on Communities and Technologies, Sep. 19, 2003, Amsterdam, pp. 1 6.
Roush, Wade, "Social Machines", Continuous Computing Blog, Jul. 5, 2005, pp. 1-21.
Roush, Wade, "Social Machines", Technology Review, Aug. 2005, pp. 45-51.

(56) References Cited

OTHER PUBLICATIONS

Sheppard, Brett, "The Rights Stuff: The Integration of Enterprise Digital Rights Management Into an Enterprise Architecture", ECantent, vol. 29, No. 9, Nov. 2006, p. 38, 40-44, (pp. 1-7 of attached).
Voight, Joan et al., "Lessons for Today's Digital Market", ADWEEKCOM, Oct. 2, 2006, pp. 1-6.
"Companies add new communication features to photo sharing.", Digital Imaging Digest, Feb. 2006, pp. 1-2.
"Dave.TV and Eye Music Network Empower Users to Create Their Own Music TV Channel on Their Sites With New IPTV Channel", www.davenw.com/2006, Sep. 13, 2006, pp. 1-2.
"Digital rights management: a primer: developing a user-friendly means of protecting content.(Profile)", Screen Digest, No. 420, p. 305, Sep. 2006, (pp. 1-9 of attached).
"Emerging Markets: What media 2.0 can offer advertisers.", Campaign, Oct. 27, 2006, p. 26, (pp. 1-5 of attached).
"Reality Digital Debuts Opus", www.lightreading.com. Sep. 25, 2006, pp. 1.
"Reality Digital—Making Media Move", www.realitydigital.com, Nov. 28, 2006, pp. 1-2.
Notification of Transmittal of The International Search Report and The Written Opinion of The International Search Authority, or Declaration (PCT/US2007/'084797) dated Mar. 21, 2008; 11 pages.
International Search Report (PCT/US2007/084807) dated May 27, 2008; 3 pages.
International Preliminary Report on Patentability (PCT/US2007/084807) dated May 26, 2009; 5 pages.
International Search Report (PCT/US2010/026063) dated May 27, 2008; 3 pages.
Rekimoto, et al., "CyberCode: designing augmented reality environments with visual tags." Proceedings of DARE 2000 on Designing augmented reality environments, Elsinore, Denmark, pp. 1-11 Apr. 12-14, 2000.
"Semacode-URL Barcodes-practical ubiquitous computing", located at http://semacode.org visited on Apr. 13, 2007; 3 pages.
"Technical White Paper: Choosing the best 2D barcode format for mobile apps," Semacode, Jul. 15, 2006; pp. 1-7 located at http://semacode.org/about/technical/whitepaper/best2_d_code.pdf.
Carbonell, J. et al. (Aug. 24-28, 1998). "The Use of MMR, Diversity-Based Reranking for Reordering Documents and Producing Summaries," SIGIR '98: Proceedings of the 21 S Annual International ACM SIGIR Conference on Research and Development in Information Retrieval: Melbourne, Australia W.B. Croft et al. eds., pp. 335-336.
Cooper, M. et al. (Nov. 2-8, 2003). "Temporal Event Clustering for Digital Photo Collections," MM'03 Berkeley, California, pp. 364-373.
Davis, M. et al. (Oct. 10-16, 2004). "From Context to Content: Leveraging Context to Infer Media Metadata," MM'04 New York, New York. 9 pages.
Davis, M. et al. "From Context to Content: Leveraging Context for Mobile Media Metadata." 9 pages.
Davis. M. et al. (Apr. 2-7, 2005). "MMM2: Mobile Media Metadata for Media Sharing," CHI 2005 Portland, Oregon. 4 pages.
Davis, M. et al. "Mobile Media Metadata for Mobile Imaging." Jun. 27-30, 2004; 4 pages.
Davis, M. et al. "Using Context and Similarity for Face and Location Identification." 10 pages.
Flickr. Welcome to Flickr—Photo Sharing, located at <http://www.flickr.com > visited on Feb. 26, 2007, one page.
Gargi, U. (Aug. 7, 2003). "Consumer Media Capture: Time-Based Analysis and Event Clustering," Technical Report HPL-2003-165 HP Laboratories Palo Alto, pp. 1-15.
Goldberger, J. et al. The Hungarian Clustering Method, located at <http://scholar.googles.com/scholar?num=20&h1=en&lr=&9=cache:vbwslsm1CisJ:www.openu .acil/Personal_sites/tarnirtassa/Publications/hcm.
pdf+goldberger+clustering+method+hungarian> visited on Mar. 1, 2007, twelve pages.

Graham, A. et al. (Jul. 13-17, 2002). Time as Essence for Photo Browsing Through Personal Digital Libraries, JCDL '02 Portland, Oregon. 11 pages.
Jaffe, A. et al. (May 23-26, 2006). "Generating Summaries for Large Collections of Geo-Referenced Photographs," WWW 2006 Edinburgh, Scotland. 2 pages.
Jaffe, A. et al. (Oct. 26-27, 2006). "Generating Summaries and Visualization for Large Collections of Geo-Referenced Photographs," MIR '06 Santa Barbara, California. 11 pages.
Joshi, D. et al. (Oct. 15-16, 2004). "The Story Picturing Engine: Finding Elite Images to Illustrate a Story Using Miitual Reinforcement," MIR '04 New York, New York. 9 pages.
Naaman, M. et al. (Nov. 2003). "From Where to What: Metadata Sharing for Digital Photographs with Geographic Coordinates," In on the Move to Meaningful Internet Systems 2003: Coop/S, DOA, and ODBASE R. Meersman et al. eds., pp. 196-217.
Naaman, M. et al. (Jun. 7-11, 2004). "Automatic Organization for Digital Photographs with Geographic Coordinates" Proceedings of the Fourth ACM/IEEE Joint Conference on Digital Libraries Global Reach and Diverse Impact: Tucson, Arizona, pp. 53-62.
Nair, R. et al. (Nov. 6-11, 2005). "Photo L01: Browsing Multi-User Photo Collections," MM'05 Singapore, pp. 223-224.
O'Hare, N. et al. "Combination of Content Analysis and Context Features for Digital Photograph Retrieval." 7 pages.
Pigeau, A. et al. (Jun. 17, 2005). "Organizing a Personal Image Collection with Statistical Model-Based ICL Clustering on Spatio-Temporal Camera Phone Meta-Data." 25 pages.
Sarvas, R. et al. (Jun. 6-9, 2004). "Metadata Creation System for Mobile Images," MobiSys'04 Boiton, Massachusetts, pp. 36-48.
Toyama, K. et al. (Nov. 2-8, 2003). "Geographic Location Tags on Digital Images," MM'03'Berkeley: California. 12 pages.
U.S. Appl. No. 11/593,668, filed Nov. 6, 2006 for Naaman, et al.
U.S. Appl. No. 11/593,869, filed Nov. 6, 2006 for Naaman, et al.
"Gutenkarte" Book Catalog, 2006 MetaCarta, Inc., www.gutenkarte.org 11 pgs.
Baron, N.S. et al. (Aug. 30, 2005). "Tethered or Mobile? Use of Away Messages in Instant Messaging by American College Students," Chapter 20.1 in Mobile Communication, Springer: London, England, 31:293-297.
Jones, C. et al. (2004). "Ad-Hoc Meeting System," Final Presentation from Project Group #7, SIMS 202, Fall 2004 Class, UC Berkley School of Information Management & Systems, located at <http://www2.sims.berkeley.edu/academics/courses/is202/f04/phone_project/Group7/ >, last visited on Feb. 2, 2010, thirteen pages.
Manguy, L. et al. (2006). "iTour—Packing the World Into Your Mobile Device," Final Presentation from Project Group #6, SIMS 202, Fall 2004 Class, UC Berkley School of Information Management & Systems, located at <http://www2.sims.berkeley.edu/academics/courses/is202/f04/phone_project/Group6/index.h >. . . , last visited on Feb. 2, 2010, ten pages.
Mitnick, S. et al. (2004). "Pillbox," Final Presentation from Project Group #8, SIMS: 02: Fall 2004 Class, UC Berkley School of Information Management & Systems, located at <http://www2.sims.berkeley.edu/academics/courses/is202/f04/phone_project/Group8/about.p . . . ,> last visited on Feb. 2, 2010, seventeen pages.
Wooldridge, M. et al. (2005). "STALK. The Camera-phone Scavenger Hunt!" located at <http://www.stalk.com >, last visited on Dec. 28, 2009, two pages.
www.stalk.com (retrieved on Dec. 29, 2009) pp. 1-2.
Anonymous. (Date Unknown). "CommunityWalk—About,"located at <http://www.communitywalk.com/about >, last visited on Mar. 3, 2008, one page.
Anonymous. (Date Unknown). "CommunityWalk Mapping Made Easy," located at <http://www.communitywalk.com/>, last visited on Mar. 3, 2008, one page.
Anonymous. (Date Unknown). "Google Earth User Guide" located at <http://earth.google.com/userguide/v4/>, last visited on Feb. 27, 2008, twelve pages.
Anonymous. (Date Unknown). "Google Earth—Wikipedia, the Free Encyclopedia," located at <http://en.wikipedia.org/wiki/Google_earth >, last visited on Mar. 3, 2008, fourteen pages.

(56) References Cited

OTHER PUBLICATIONS

Anonymous. (Date Unknown). "Google Earth User Guide—Using Image Overlays and 3D Models," located at <http://earth.google.com/userguide/v4/ug_imageoverlays.html >, nine pages.
Anonymous. (Date Unknown). "Google Maps," located at <http://en.wikipedia.org/wiki/Google_maps >, last visited on Feb. 27, 2008, eleven pages.
Anonymous. (Date Unknown). "Live Search Maps," located at <http://en.wikipedia.org/wiki/Windows_live_maps >, last visited on Mar. 3, 2008, six pages.
Anonymous. (Date Unknown). "WikiMapia," located at <http://en.wikipedia.org/wiki/WikiMapia >, last visited on Mar. 3, 2008, three pages.
Anonymous. (2007). "Ask.com Maps & Directions," located at <http://maps.ask.com/maps >, last visited on Mar. 3, 2008, one page.
Anonymous. (2007). "Wayfaring Follow You, Follow Me," located at <http://www.wayfaring.com/>, last visited on Mar. 3, 2008, three pages.
Anonymous. (2008). "Platial the People's Atlas," located at <www.platial.com >, last visited on Mar. 3, 2008, one page.
Anonymous (2008). "Wikimpaia.org ," located at <http://wikimpaia.org/>, last visited on Mar. 3, 2008, one page.
Almieda, R.B. et al. "A Community-Aware Search Engine," WWW2004, New York., NY, May 17-22, 2004, pp. 413-421.
Anonymous. (Jul. 16, 2006). MyFantasyLeague Fantasy Football League Management—Features, located at <http://web.archive.org/web/20060716072900/www.myfantasyleague.com/features.htm >, last visited on Feb. 10, 2009, four pages.
Anonymous. (Jul. 17, 2006). "Fantasy Football Lineup Analyzer—Tips for Who to Start & Who to Bench each Week," located at http://web.archive.org/web/200607171633529/www.fantasyfootballstarters.com/lineupAnalyzer.jsp>, last visited on Feb. 10, 2009, one page.
Bharat, K. (Date Unknown). "SearchPad: Explicit Capture of Search Context to Support Web Search," located at <http://www9.org/w9cdrom/173/173.html >, last visited Aug. 1, 2007, 13 pages.
Budzik, J. et al. (2000). "User Interactions with Everyday Applications as Context for Just-in-Time Information Access," Proceeding of the 2000 Conference on Intelligent User Interfaces, eight pages.
Finkelstein, L. et al. (2001). "Placing Search in Context: The Concept Revisited," WWW/O, Hong Kong, May 2-5, 2001, pp. 406-414.
Freyne, J. et al. (2004). "Further Experiments on Collaborative Ranking in Community-Based Web Search," Artificial Intelligence Review, pp. 1-23.
Lieberman, H. (1995) "Letizia: An Agent that Assists Web Browsing," Proceedings of the Fourteenth International Joint Conference on Artificial Intelligence, Aug. 20-25, 1995, six pages.
Mitra, M. et al. (1998). "Improving Automatic Query Expansion," Proceedings of the AMC SIGIR, nine pages.
Rhodes, B.J. et al. (1996). "Remembrance Agent: A Continuously Running Automated Information Retrieval System," Proceedings of the First International Conference on the Practical Application of Intelligent Agents and Multi Agent Technology (PAAM), pp. 487-495, located at <http://www.cc.gatech.edu/fac/Thad.Starner/p/032_40_agents&ubicomp/remembrance-agent . . . >, last visited Aug. 1, 2007, six pages.
Sansbury, C. (Sep. 13, 2005). "Yahoo! Widget for BBC Sports News—Scotland," 32. located at <http://widgets.yahoo.com/gallery/view.php?widget=37220 >, last visited on Feb. 7, 2007, one page.
Yahoo! Inc. (Dec. 7, 2005). "Yahoo! Widget Engine 3.0 Reference Manual Version 3.0," 300 pages.
U.S. Appl. No. 12/407,690, filed Mar. 19, 2009; 50 pages.
U.S. Appl. No. 12/407,681, filed Mar. 19, 2009; 56 pages.
International Search Report PCT/US2008/088228 dated Sep. 30, 2009—2 pages.
Written Opinion PCT/US2008/088228 dated Sep. 30, 2009—5 pages.
U.S. Appl. No. 12/409,867, filed Mar. 24, 2009, King.
U.S. Appl. No. 12/540,098, filed Aug. 12, 2009, Martinez.
U.S. Appl. No. 12/536,892, filed Aug. 6, 2009, King.
U.S. Appl. No. 12/540,588, filed Aug. 13, 2009, Tendjoukian.
U.S. Appl. No. 12/015,115, filed Jan. 16, 2006, Higgins.
U.S. Appl. No. 12/180,486, filed Jul. 25, 2008, Higgins.
U.S. Appl. No. 12/180,499, filed Jul. 25, 2008, Higgins.
U.S. Appl. No. 12/015,146, filed Jan. 16, 2008, Higgins.
U.S. Appl. No. 12/041,088, filed Mar. 3, 2008, Higgins.
U.S. Appl. No. 12/041,062, filed Mar. 3, 2008, Higgins.
U.S. Appl. No. 12/041,054, filed Mar. 3, 2008, Higgins.
U.S. Appl. No. 12/540,269, filed Aug. 12, 2009, Kalaboukis.
U.S. Appl. No. 11/969,815, filed Jan. 4, 2004, Davis.
U.S. Appl. No. 12/182,111, filed Jul. 29, 2008, Davis.
U.S. Appl. No. 12/434,575, filed May 1, 2009, O'Sullivan.
U.S. Appl. No. 12/434,580, filed May 1, 2009, O'Sullivan.
U.S. Appl. No. 12/407,690, filed Mar. 19, 2009, Davis.
U.S. Appl. No. 12/407,681, filed Mar. 19, 2009, Athsani.
International Search Report (PCT/US2009/030405) dated Sep. 23, 2009; 2 pages.
U.S. Appl. No. 12/041,054, file history dated Mar. 3, 2008; 64 pgs.
U.S. Appl. No. 12/041,062 file history dated Mar. 3, 2008; 66 pgs.
U.S. Appl. No. 12/041,088 file history dated Mar. 3, 2008; 66 pgs.
U.S. Appl. No. 12/169,931 file history dated Jul. 9, 2008; 66 pgs.
U.S. APpl. No. 12/170,025 file history dated Jul. 9, 2008; 67 pgs.
U.S. Appl. No. 12/180,499 file history dated Jul. 25, 2008; 67 pgs.
U.S. Appl. No. 12/180,486 file history dated Jul. 25, 2008; 65 pgs.
International Search Report PCT/US2009/030406 dated Sep. 29, 2009; 5 pages.
International Search Report and Written Opinion PCT/US2009/034445 dated Oct. 12, 2009; 7 pages.
Office Action U.S Appl. No. 12/041,054 dated Oct. 27, 2010; 15 pages.
Office Action U.S. Appl. No. 12/041,062 dated Oct. 28, 2010; 12 pages.
International Search Report PCT/US2009/034444 dated Sep. 18, 2009; 2 pages.
Office Action U.S. Appl. No. 12/041,088 dated Oct. 4, 2010; 18 pages.
Nedos, A; Singh K., Clarke S, Proximity Based Group Communications for Mobile Ad Hoc Networks; Proximity-Based Group Communication; Global Smart Spaces; D.14; Oct. 3, 2003; 31 pages.
Brunato, M; Battiti R. "Pilgrim: A Location Broker and Mobility-Aware Recommendation System"; Technical report DIT-02-0092, Universita di Trento, Oct. 2002; 8 pages.
Backstrom et al., Spatial Variation in Search Engine Queries, WWW•2008, Beijing, China (Apr. 21-25, 2008).
Gan et al., Analysis of Geographic Queries in a Search Engine Log, LocWeb 2008, Beijing, China (Apr. 22, 2008).
Jones et al., Geographic Intention and Modification in Web Search, International Journal of Geographical Information Science, vol. 22, No. 3, pp. 1-20 (Jul. 2008).
Sanderson et al., Analyzing Geographic Queries; Department of Information Studies; University of Sheffield, UK; 2 pages.
Go With the Flow, The Economist Technology Quarterly, vol. 382, Issue 8519, 4 pages, (Mar. 10, 2007).
International Search Report and Written Opinion (PCT/US2009/060476) dated May 4, 2010; 12 pages.
International Search Report and Written Opinion (PCT/US2009/060374) dated Apr. 30, 2010; 12 pages.
International Search Report (PCT/US2009/060379) dated Apr. 30, 2010; 3 pages.
International Search Report and Written Opinion (PCT/US2008/085135) dated May 25, 2009; 7 pages.
International Search Report (PCT/US2009/055503) dated Apr. 8, 2010; 3 pages.
Written Opinion (PCT/US2008/085915) dated Jun. 29, 2009; 4 pages.
Written Opinion (PCT/US2008/086948) dated May 21, 2009; 5 pages.
International Search Report and Written Opinion (PCT/US2009/051247) dated Jan. 25, 2010; 9 pages.
International Search Report and Written Opinion (PCT/US2009/046258) dated Dec. 23, 2009; 7 pages.

* cited by examiner

SYSTEM AND METHOD FOR ADDRESSING COMMUNICATIONS

BACKGROUND

A great deal of information is generated when people use electronic devices, such as when people use mobile phones and cable set-top boxes. Such information, such as location, applications used, social network, physical and online locations visited, to name a few, could be used to deliver useful services and information to end users, and provide commercial opportunities to advertisers and retailers. However, most of this information is effectively abandoned due to deficiencies in the way such information can be captured. For example, and with respect to a mobile phone, information is generally not gathered while the mobile phone is idle (i.e., not being used by a user). Other information, such as presence of others in the immediate vicinity, time and frequency of messages to other users, and activities of a user's social network are also not captured effectively.

SUMMARY

This disclosure describes systems and methods for using data collected and stored by multiple devices on a network in order to improve the performance of the services provided via the network. In particular, the disclosure describes a markup language for addressing and delivering communications on a network.

One aspect of the disclosure is a method of transmitting information objects (IOs) that includes defining a plurality of conditional operators including a first conditional operator, in which each conditional operator indicates a different relationship type and the first conditional operator identifies a first relationship type. The method then receives a request from a sender real-world entity (RWE) to deliver a first IO to a recipient RWE identified by an address string. The address string is parsed to identify at least a first descriptor, a second descriptor and a first conditional operator. The first relationship type is indicated through retrieval from the first conditional operator. One of a set of RWEs is selected to be the recipient RWE based on a comparison of data associated with the RWEs, the first descriptor, the second descriptor and the first relationship type. The first IO is transmitted to the selected recipient RWE using a unique identifier associated with the recipient RWE.

Another aspect of the disclosure is a markup language stored on a computer-readable medium for addressing a communication. The markup language includes one or more first conditional operators, in which each first conditional operator signifies a different relationship between two entities, and one or more second conditional operators, where each second conditional operator signifies a different delivery condition type. The markup language further includes a defined syntax for combining one or more descriptors and at least one of the first or second conditional operators to generate an address string for a communication that can be parsed by a communication system to identify an intended recipient of the communication.

In yet another aspect, the disclosure describes a system for delivering information objects (IOs) including a correlation engine connected via at least one communication channel to a plurality of computing devices transmitting IOs over the at least one communication channel. A computer-readable media connected to the correlation engine stores at least one of social data, spatial data, temporal data and logical data associated with a plurality of real-world entities (RWEs) including the plurality of computing devices. The system further includes an address parsing engine that parses an address string associated with an IO and that selects a recipient RWE based on an identification in the address string of one or more descriptors and at least one conditional operator selected from first conditional operators and second conditional operators, each first conditional operator signifying a different relationship between two entities, and each second conditional operator signifying a different delivery condition type.

These and various other features as well as advantages will be apparent from a reading of the following detailed description and a review of the associated drawings. Additional features are set forth in the description that follows and, in part, will be apparent from the description, or can be learned by practice of the described embodiments. The benefits and features will be realized and attained by the structure particularly pointed out in the written description and claims hereof as well as the appended drawings.

It is to be understood that both the foregoing general description and the following detailed description are exemplary and explanatory and are intended to provide further explanation of the disclosure as claimed.

BRIEF DESCRIPTION OF THE DRAWINGS

The following drawing figures, which form a part of this application, are illustrative of embodiments systems and methods described below and are not meant to limit the scope of the disclosure in any manner, which scope shall be based on the claims appended hereto.

DETAILED DESCRIPTION

Figure 1:
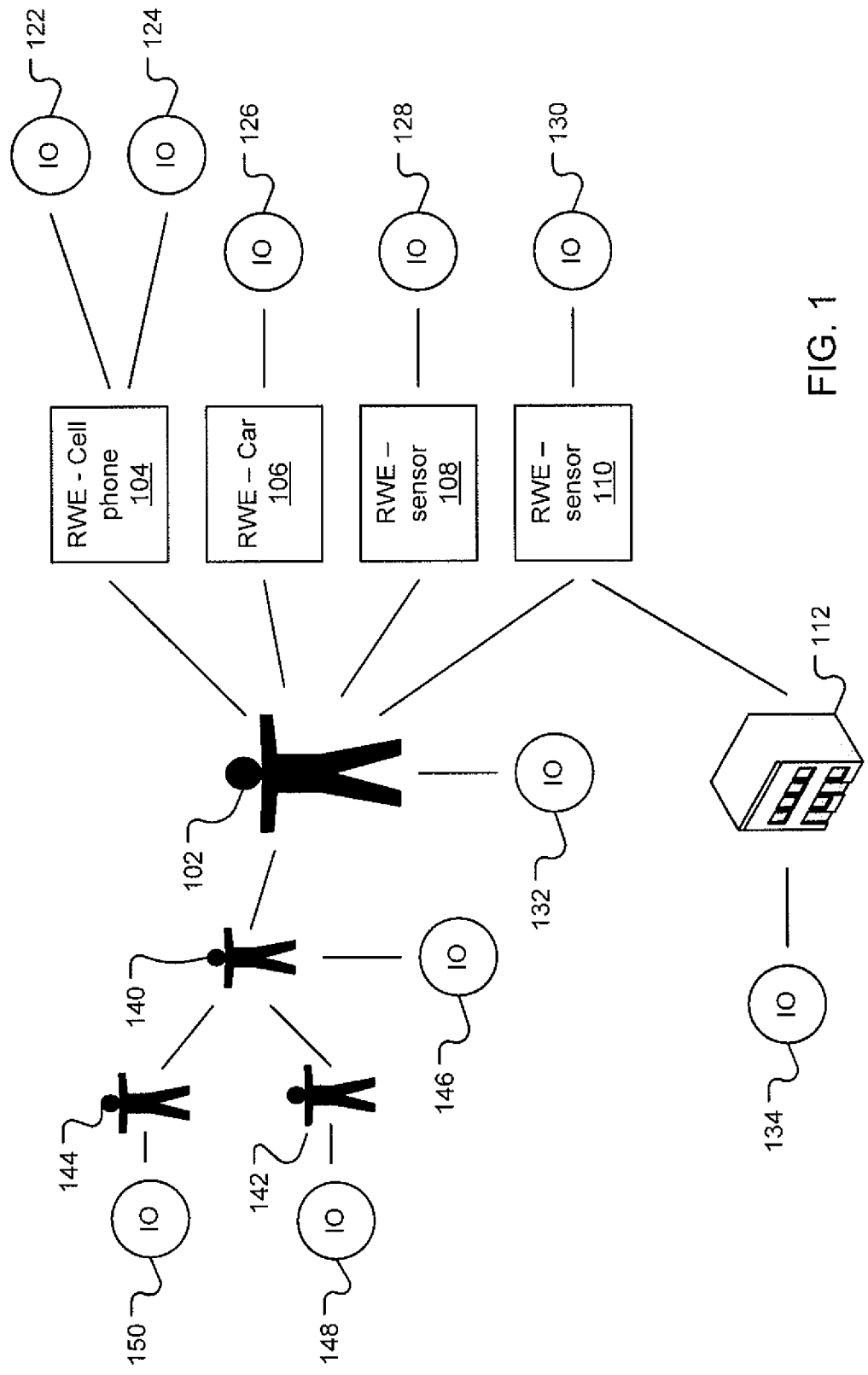
FIG. 1 illustrates an example of the relationships between RWEs and IOs on the W4 COMN.

This disclosure describes a communication network, referred herein as the "W4 Communications Network" or W4 COMN, that uses information related to the "Who, What, When and Where" of interactions with the network to provide improved services to the network's users. The W4 COMN is a collection of users, devices and processes that foster both synchronous and asynchronous communications between users and their proxies. It includes an instrumented network of sensors providing data recognition and collection in real-world environments about any subject, location, user or combination thereof.

As a communication network, the W4 COMN handles the routing/addressing, scheduling, filtering, prioritization, replying, forwarding, storing, deleting, privacy, transacting, triggering of a new message, propagating changes, transcoding and linking. Furthermore, these actions can be performed on any communication channel accessible by the W4 COMN.

The W4 COMN uses a data modeling strategy for creating profiles for not only users and locations but also any device on the network and any kind of user-defined data with user-specified conditions from a rich set of possibilities. Using Social, Spatial, Temporal and Logical data available about a specific user, topic or logical data object, every entity known to the W4 COMN can be mapped and represented against all other known entities and data objects in order to create both a micro graph for every entity as well as a global graph that interrelates all known entities against each other and their attributed relations.

In order to describe the operation of the W4 COMN, two elements upon which the W4 COMN is built must first be introduced, real-world entities and information objects. These distinction are made in order to enable correlations to be made from which relationships between electronic/logical objects and real objects can be determined. A real-world entity (RWE) refers to a person, device, location, or other physical thing known to the W4 COMN. Each RWE known to the W4 COMN is assigned or otherwise provided with a unique W4 identification number that absolutely identifies the RWE within the W4 COMN.

RWEs can interact with the network directly or through proxies, which can themselves be RWEs. Examples of RWEs that interact directly with the W4 COMN include any device such as a sensor, motor, or other piece of hardware that connects to the W4 COMN in order to receive or transmit data or control signals. Because the W4 COMN can be adapted to use any and all types of data communication, the devices that can be RWEs include all devices that can serve as network nodes or generate, request and/or consume data in a networked environment or that can be controlled via the network. Such devices include any kind of "dumb" device purpose-designed to interact with a network (e.g., cell phones, cable television set top boxes, fax machines, telephones, and radio frequency identification (RFID) tags, sensors, etc.). Typically, such devices are primarily hardware and their operations can not be considered separately from the physical device.

Examples of RWEs that must use proxies to interact with W4 COMN network include all non-electronic entities including physical entities, such as people, locations (e.g., states, cities, houses, buildings, airports, roads, etc.) and things (e.g., animals, pets, livestock, gardens, physical objects, cars, airplanes, works of art, etc.), and intangible entities such as business entities, legal entities, groups of people or sports teams. In addition, "smart" devices (e.g., computing devices such as smart phones, smart set top boxes, smart cars that support communication with other devices or networks, laptop computers, personal computers, server computers, satellites, etc.) are also considered RWEs that must use proxies to interact with the network. Smart devices are electronic devices that can execute software via an internal processor in order to interact with a network. For smart devices, it is actually the executing software application(s) that interact with the W4 COMN and serve as the devices' proxies.

The W4 COMN allows associations between RWEs to be determined and tracked. For example, a given user (an RWE) can be associated with any number and type of other RWEs including other people, cell phones, smart credit cards, personal data assistants, email and other communication service accounts, networked computers, smart appliances, set top boxes and receivers for cable television and other media services, and any other networked device. This association can be made explicitly by the user, such as when the RWE is installed into the W4 COMN. An example of this is the set up of a new cell phone, cable television service or email account in which a user explicitly identifies an RWE (e.g., the user's phone for the cell phone service, the user's set top box and/or a location for cable service, or a username and password for the online service) as being directly associated with the user. This explicit association can include the user identifying a specific relationship between the user and the RWE (e.g., this is my device, this is my home appliance, this person is my friend/father/son/etc., this device is shared between me and other users, etc.). RWEs can also be implicitly associated with a user based oil a current situation. For example, a weather sensor on the W4 COMN can be implicitly associated with a user based on information indicating that the user lives or is passing near the sensor's location.

An information object (IO), on the other hand, is a logical object that stores, maintains, generates, serves as a source for or otherwise provides data for use by RWEs and/or the W4 COMN. IOs are distinct from RWEs in that IOs represent data, whereas RWEs can create or consume data (often by creating or consuming IOs) during their interaction with the W4 COMN. Examples of IOs include passive objects such as communication signals (e.g., digital and analog telephone signals, streaming media and interprocess communications), email messages, transaction records, virtual cards, event records (e.g., a data file identifying a time, possibly in combination with one or more RWEs such as users and locations, that can further be associated with a known topic/activity/ significance such as a concert, rally, meeting, sporting event, etc.), recordings of phone calls, calendar entries, web pages, database entries, electronic media objects (e.g., media files containing songs, videos, pictures, images, audio messages, phone calls, etc.), electronic files and associated metadata.

In addition, IOs include any executing process or application that consumes or generates data such as an email communication application (such as OUTLOOK by MICROSOFT, or YAHOO! MAIL by YAHOO!), a calendaring application, a word processing application, an image editing application, a media player application, a weather monitoring application, a browser application and a web page server application. Such active IOs can or can not serve as a proxy for one or more RWEs. For example, voice communication software on a smart phone can serve as the proxy for both the smart phone and for the owner of the smart phone.

An IO in the W4 COMN can be provided a unique W4 identification number that absolutely identifies the IO within the W4 COMM, Although data in an IO can be revised by the act of an RWE, the IO remains a passive, logical data representation or data source and, thus, is not an RWE.

For every IO there are at least three classes of associated RWEs. The first is the RWE who owns or controls the IO, whether as the creator or a rights holder (e.g., an RWE with editing rights or use rights to the IO). The second is the RWE(s) that the IO relates to, for example by containing information about the RWE or that identifies the RWE. The third are any RWEs who then pay any attention (directly or through a proxy process) to the IO, in which "paying attention" refers to accessing the IO in order to obtain data from the TO for some purpose.

"Available data" and "W4 data" means data that exists in an IO in some form somewhere or data that can be collected as needed from a known IO or RWE such as a deployed sensor. "Sensor" means any source of W4 data including PCs, phones, portable PCs or other wireless devices, household devices, cars, appliances, security scanners, video surveillance, RFID tags in clothes, products and locations, online data or any other source of information about a real-world user/topic/thing (RWE) or logic-based agent/process/topic/thing (IO).

FIG. 1 illustrates an example of the relationships between RWEs and IOs on the W4 COMN. In the embodiment illustrated, a user 102 is a RWE of the network provided with a unique network ID. The user 102 is a human that communicates with the network via the proxy devices 104, 106, 108, 110 associated with the user 102, all of which are RWEs of the network and provided with their own unique network ID, Some of these proxies can communicate directly with the W4 COMN or can communicate with the W4 COMN via IOs such as applications executed on or by the device.

As mentioned above the proxy devices 104, 106, 108, 110 can be explicitly associated with the user 102. For example, one device 104 can be a smart phone connected by a cellular service provider to the network and another device 106 can be a smart vehicle that is connected to the network. Other devices can be implicitly associated with the user 102. For example, one device 108 can be a "dumb" weather sensor at a location matching the current location of the user's cell phone 104, and thus implicitly associated with the user 102 while the two RWEs 104, 108 are co-located. Another implicitly associated device 110 can be a sensor 110 for physical location 112 known to the W4 COMN. The location 112 is known, either explicitly (through a user-designated relationship, e.g., this is my home, place of employment, parent, etc.) or implicitly (the user 102 is often co-located with the RWE 112 as evidenced by data from the sensor IO at that location 112), to be associated with the first user 102.

The user 102 can also be directly associated with other people, such as the person 140 shown, and then indirectly associated with other people 142, 144 through their associations as shown. Again, such associations can be explicit (e.g., the user 102 can have identified the associated person 140 as his/her father, or can have identified the person 140 as a member of the user's social network) or implicit (e.g., they share the same address).

Tracking the associations between people (and other RWEs as well) allows the creation of the concept of "intimacy": Intimacy being a measure of the degree of association between two people or RWEs. For example, each degree of removal between RWEs can be considered a lower level of intimacy, and assigned lower intimacy score. Intimacy can be based solely on explicit social data or can be expanded to include all W4 data including spatial data and temporal data.

Each RWE 102, 104, 106, 108, 110, 112, 140, 142, 144 of the W4 COMN can be associated with one or more IOs as shown. Continuing the examples discussed above, FIG. 1 illustrates two IOs 122, 124 as associated with the cell phone device 104. One IO 122 can be a passive data object such as an event record that is used by scheduling/calendaring software on the cell phone, a contact IO used by an address book application, a historical record of a transaction made using the device 104 or a copy of a message sent from the device 104. The other IO 124 can be an active software process or application that serves as the device's proxy to the W4 COMN by transmitting or receiving data via the W4 COMN. Voice communication software, scheduling/calendaring software, an address book application or a text messaging application are all examples of IOs that can communicate with other IOs and RWEs on the network. The IOs 122, 124 can be locally stored on the device 104 or stored remotely on some node or datastore accessible to the W4 COMN, such as a message server or cell phone service datacenter. The IO 126 associated with the vehicle 108 can be an electronic file containing the specifications and/or current status of the vehicle 108, such as make, model, identification number, current location, current speed, current condition, current owner, etc. The IO 128 associated with sensor 108 can identify the current state of the subject(s) monitored by the sensor 108, such as current weather or current traffic. The IO 130 associated with the cell phone 110 can be information in a database identifying recent calls or the amount of charges on the current bill.

Furthermore, those RWEs which can only interact with the W4 COMN through proxies, such as the people 102, 140, 142, 144, computing devices 104, 106 and location 112, can have one or more IOs 132, 134, 146, 148, 150 directly associated with them. An example includes IOs 132, 134 that contain contact and other RWE-specific information. For example, a person's IO 132, 146, 148, 150 can be a user profile containing email addresses, telephone numbers, physical addresses, user preferences, identification of devices and other RWEs associated with the user, records of the user's past interactions with other RWE's on the W4 COMN (e.g., transaction records, copies of messages, listings of time and location combinations recording the user's whereabouts in the past), the unique W4 COMN identifier for the location and/or any relationship information (e.g., explicit user-designations of the user's relationships with relatives, employers, co-workers, neighbors, service providers, etc.). Another example of a person's IO 132, 146, 148, 150 includes remote applications through which a person can communicate with the W4 COMN such as an account with a web-based email service such as Yahoo! Mail. The location's IO 134 can contain information such as the exact coordinates of the location, driving directions to the location, a classification of the location (residence, place of business, public, non-public, etc.), information about the services or products that can be obtained at the location, the unique W4 COMN identifier for the location, businesses located at the location, photographs of the location, etc.

In order to correlate RWEs and IOs to identify relationships, the W4 COMN makes extensive use of existing metadata and generates additional metadata where necessary. Metadata is loosely defined as data that describes data. For example, given an IO such as a music file, the core, primary or object data of the music file is the actual music data that is converted by a media player into audio that is heard by the listener. Metadata for the same music file can include data identifying the artist, song, etc., album art, and the format of the music data. This metadata can be stored as part of the music file or in one or more different IOs that are associated with the music file or both. In addition, W4 metadata for the same music file can include the owner of the music file and the rights the owner has in the music file. As another example, if the IO is a picture taken by an electronic camera, the picture can include in addition to the primary image data from which an image can be created on a display, metadata identifying when the picture was taken, where the camera was when the picture was taken, what camera took the picture, who, if anyone, is associated (e.g., designated as the camera's owner) with the camera, and who and what are the subjects of/in the picture. The W4 COMN uses all the available metadata in order to identify implicit and explicit associations between entities and data objects.

Figure 2:
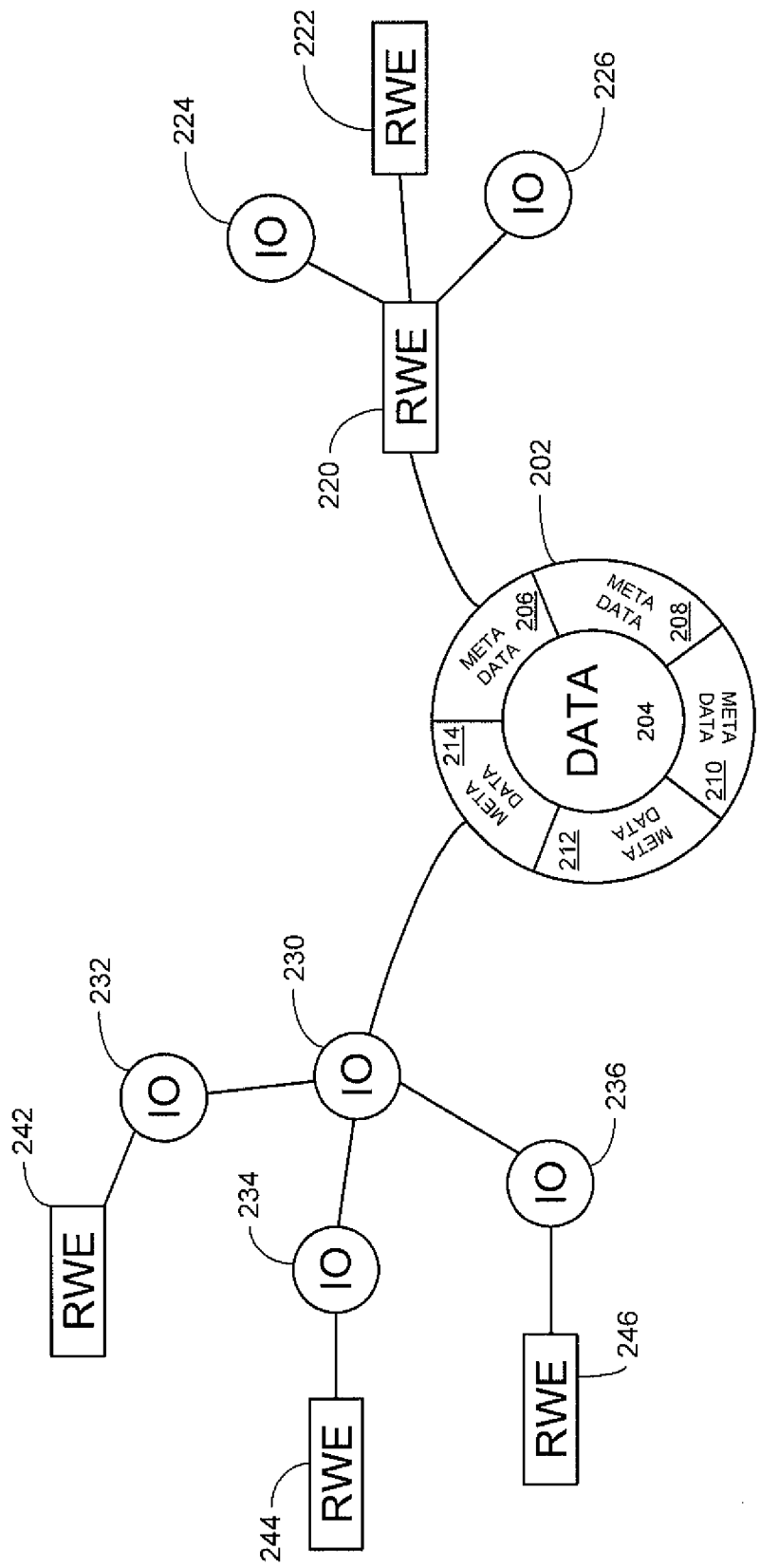
FIG. 2 illustrates an example of metadata defining the relationships between RWEs and IOs on the W4 COMN.

FIG. 2 illustrates an example of metadata defining the relationships between RWEs and IOs on the W4 COMN. In the embodiment shown, an IO 202 includes object data 204 and five discrete items of metadata 206, 208, 210, 212, 214. Some items of metadata 208, 210, 212 can contain information related only to the object data 204 and unrelated to any other IO or RWE. For example, a creation date, text or an image that is to be associated with the object data 204 of the IO 202.

Some of items of metadata 206, 214, on the other hand, can identify relationships between the IO 202 and other RWEs and IOs. As illustrated, the IO 202 is associated by one item of metadata 206 with an RWE 220 that RWE 220 is further associated with two IOs 224, 226 and a second RWE 222 based on some information known to the W4 COMN. This part of FIG. 2, for example, could describe the relations between a picture (IO 202) containing metadata 206 that identifies the electronic camera (the first RWE 220) and the user (the second RWE 224) that is known by the system to be the owner of the camera 220. Such ownership information can be determined, for example, from one or another of the IOs 224, 226 associated with the camera 220.

FIG. 2 also illustrates metadata 214 that associates the IO 202 with another IO 230. This IO 230 is itself associated with three other IOs 232, 234, 236 that are further associated with different RWEs 242, 244, 246. This part of FIG. 2, for example, could describe the relations between a music file (IO 202) containing metadata 206 that identifies the digital rights file (the first IO 230) that defines the scope of the rights of use associated with this music file 202. The other IOs 232, 234, 236 are other music files that are associated with the rights of use and which are currently associated with specific owners (RWEs 242, 244, 246).

Figure 3:
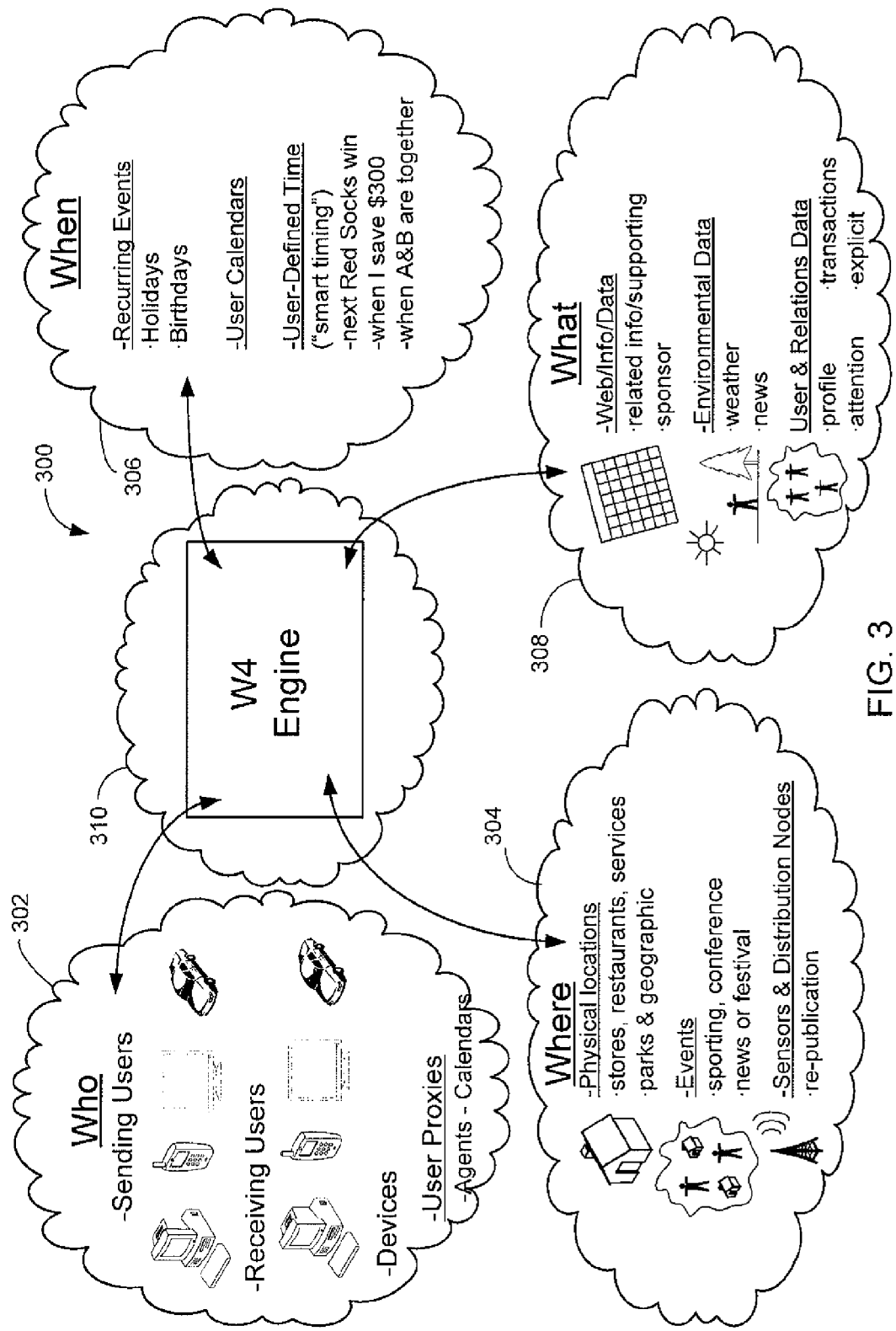
FIG. 3 illustrates a conceptual model of the W4 COMN.

FIG. 3 illustrates a conceptual model of the W4 COMN. The W4 COMN 300 creates an instrumented messaging infrastructure in the form of a global logical network cloud conceptually sub-divided into networked-clouds for each of the 4Ws: Who, Where, What and When. In the Who cloud 302 are all users whether acting as senders, receivers, data points or confirmation/certification sources as well as user proxies in the forms of user-program processes, devices, agents, calendars, etc. In the Where cloud 304 are all physical locations, events, sensors or other RWEs associated with a spatial reference point or location. The When cloud 306 is composed of natural temporal events (that is events that are not associated with particular location or person such as days, times, seasons) as well as collective user temporal events (holidays, anniversaries, elections, etc.) and user-defined temporal events (birthdays, smart-timing programs). The What cloud 308 is comprised of all known data—web or private, commercial or user—accessible to the W4 COMN, including for example environmental data like weather and news, RWE-generated data, IOs and IO data, user data, models, processes and applications. Thus, conceptually, most data is contained in the What cloud 308.

As this is just a conceptual model, it should be noted that some entities, sensors or data will naturally exist in multiple clouds either disparate in time or simultaneously. Additionally, some IOs and RWEs can be composites in that they combine elements from one or more clouds. Such composites can be classified or not as appropriate to facilitate the determination of associations between RWEs and IOs. For example, an event consisting of a location and time could be equally classified within the When cloud 306, the What cloud 308 and/or the Where cloud 304.

The W4 engine 310 is center of the W4 COMN's central intelligence for making all decisions in the W4 COMN. An "engine" as referred to herein is meant to describe a software, hardware or firmware (or combinations thereof) system, process or functionality that performs or facilitates the processes, features and/or functions described herein (with or without human interaction or augmentation). The W4 engine 310 controls all interactions between each layer of the W4 COMN and is responsible for executing any approved user or application objective enabled by W4 COMN operations or inter-operating applications. In an embodiment, the W4 COMN is an open platform upon which anyone can write an application. To support this, it includes standard published APIs for requesting (among other things) synchronization, disambiguation, user or topic addressing, access rights, prioritization or other value-based ranking, smart scheduling, automation and topical, social, spatial or temporal alerts.

One function of the W4 COMN is to collect data concerning all communications and interactions conducted via the W4 COMN, which can include storing copies of IOs and information identifying all RWEs and other information related to the IOs (e.g., who, what, when, where information). Other data collected by the W4 COMN can include information about the status of any given RWE and IO at any given time, such as the location, operational state, monitored conditions (e.g., for an RWE that is a weather sensor, the current weather conditions being monitored or for an RWE that is a cell phone, its current location based on the cellular towers it is in contact with) and current status.

The W4 engine 310 is also responsible for identifying RWEs and relationships between RWEs and IOs from the data and communication streams passing through the W4 COMN. The function of identifying RWEs associated with or implicated by IOs and actions performed by other RWEs is referred to as entity extraction. Entity extraction includes both simple actions, such as identifying the sender and receivers of a particular IO, and more complicated analyses of the data collected by and/or available to the W4 COMN, for example determining that a message listed the time and location of an upcoming event and associating that event with the sender and receiver(s) of the message based on the context of the message or determining that an RWE is stuck in a traffic jam based on a correlation of the RWE's location with the status of a co-located traffic monitor.

It should be noted that when performing entity extraction from an IO, the IO can be an opaque object with only W4 metadata related to the object (e.g., date of creation, owner, recipient, transmitting and receiving RWEs, type of IO, etc.), but no knowledge of the internals of the IO (i.e., the actual primary or object data contained within the object). Knowing the content of the IO does not prevent W4 data about the IO (or RWE) to be gathered. The content of the IO if known can also be used in entity extraction, if available, but regardless of the data available entity extraction is performed by the network based on the available data. Likewise, W4 data extracted around the object can be used to imply attributes about the object itself, while in other embodiments, full access to the IO is possible and RWEs can thus also be extracted by analyzing the content of the object, e.g. strings within an email are extracted and associated as RWEs to for use in determining the relationships between the sender, user, topic or other RWE or IO impacted by the object or process.

In an embodiment, the W4 engine 310 represents a group of applications executing on one or more computing devices that are nodes of the W4 COMN. For the purposes of this disclosure, a computing device is a device that includes a processor and memory for storing data and executing software (e.g., applications) that perform the functions described. Computing devices can be provided with operating systems that allow the execution of software applications in order to manipulate data.

In the embodiment shown, the W4 engine 310 can be one or a group of distributed computing devices, such as a general-purpose personal computers (PCs) or purpose built server computers, connected to the W4 COMN by suitable communication hardware and/or software. Such computing devices can be a single device or a group of devices acting together. Computing devices can be provided with any number of program modules and data files stored in a local or remote mass storage device and local memory (e.g., RAM) of the computing device. For example, as mentioned above, a computing device can include an operating system suitable for controlling the operation of a networked computer, such as the WINDOWS XP or WINDOWS SERVER operating systems from MICROSOFT CORPORATION.

Some RWEs can also be computing devices such as smart phones, web-enabled appliances, PCs, laptop computers, and personal data assistants (PDAs). Computing devices can be connected to one or more communications networks such as the Internet, a publicly switched telephone network, a cellular telephone network, a satellite communication network, a wired communication network such as a cable television or private area network. Computing devices can be connected any such network via a wired data connection or wireless connection such as a wi-fi, a WiMAX (802.36), a Bluetooth or a cellular telephone connection.

Local data structures, including discrete IOs, can be stored on a mass storage device (not shown) that is connected to, or part of, any of the computing devices described herein including the W4 engine 310. For example, in an embodiment, the data backbone of the W4 COMN, discussed below, includes multiple mass storage devices that maintain the IOs, metadata and data necessary to determine relationships between RWEs and IOs as described herein. A mass storage device includes some form of computer-readable media and provides non-volatile storage of data and software for retrieval and later use by one or more computing devices. Although the description of computer-readable media contained herein refers to a mass storage device, such as a hard disk or CD-ROM drive, it should be appreciated by those skilled in the art that computer-readable media can be any available media that can be accessed by a computing device.

By way of example, and not limitation, computer-readable media can comprise computer storage media and communication media. Computer storage media include volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassette, magnetic tape, magnetic disk storage or other magnetic storage devices, or any other medium which can be used to store the desired information and which can be accessed by the computer.

Figure 4:
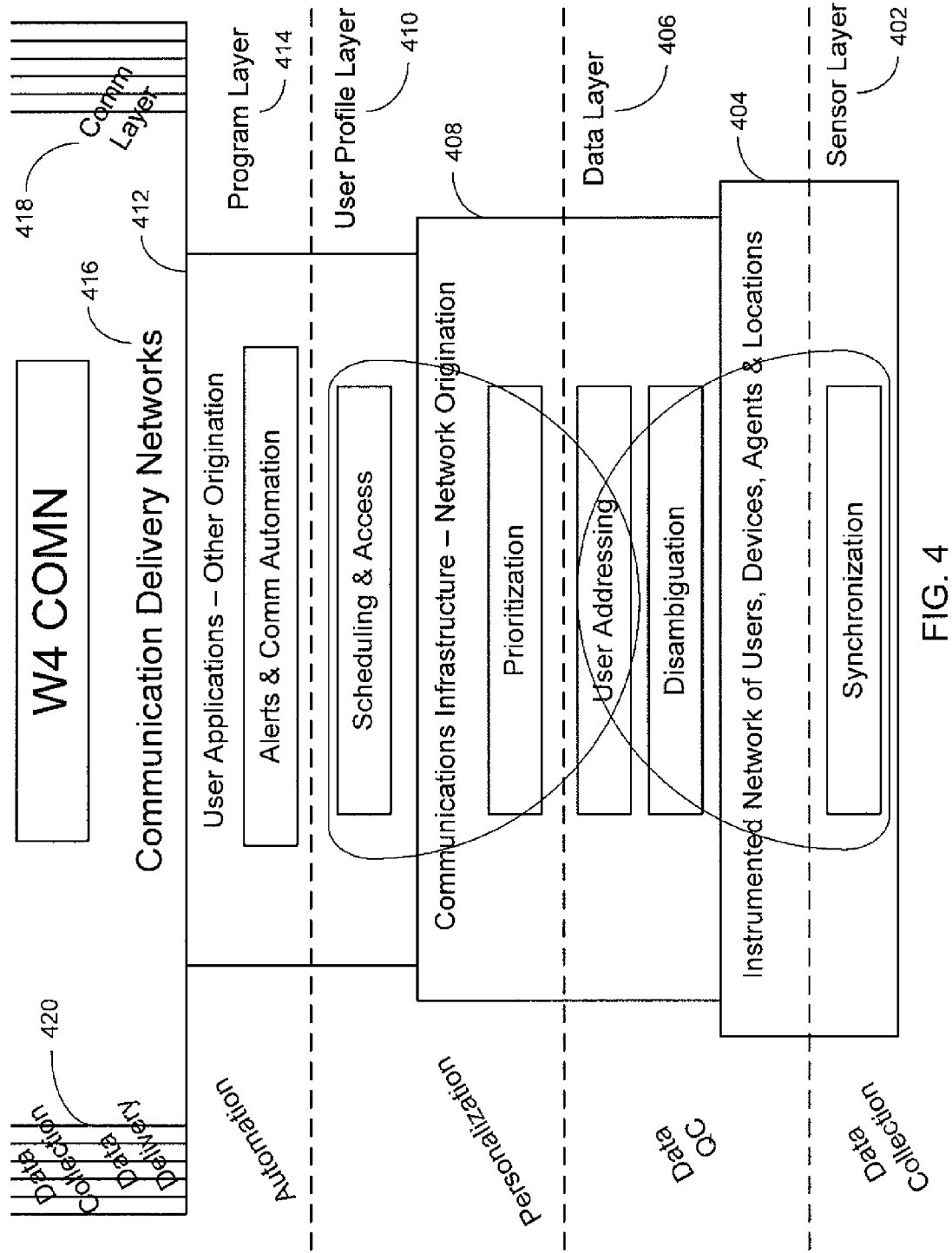
FIG. 4 illustrates the functional layers of the W4 COMN architecture.

FIG. 4 illustrates the functional layers of the W4 COMN architecture. At the lowest layer, referred to as the sensor layer 402, is the network 404 of the actual devices, users, nodes and other RWEs. The instrumentation of the network nodes to utilize them as sensors include known technologies like web analytics, GPS, cell-tower pings, use logs, credit card transactions, online purchases, explicit user profiles and implicit user profiling achieved through behavioral targeting, search analysis and other analytics models used to optimize specific network applications or functions.

The next layer is the data layer 406 in which the data produced by the sensor layer 402 is stored and cataloged. The data can be managed by either the network 404 of sensors or the network infrastructure 406 that is built on top of the instrumented network of users, devices, agents, locations, processes and sensors. The network infrastructure 408 is the core under-the-covers network infrastructure that includes the hardware and software necessary to receive that transmit data from the sensors, devices, etc. of the network 404. It further includes the processing and storage capability necessary to meaningfully categorize and track the data created by the network 404.

The next layer of the W4 COMN is the user profiling layer 410. This layer 410 can further be distributed between the network infrastructure 408 and user applications/processes 412 executing on the W4 engine or disparate user computing devices. In the user profiling layer 410 that functions as W4 COMN's user profiling layer 410. Personalization is enabled across any single or combination of communication channels and modes including email, IM, texting (SMS, etc.), photobloging, audio (e.g. telephone call), video (teleconferencing, live broadcast), games, data confidence processes, security, certification or any other W4 COMN process call for available data.

In one embodiment, the user profiling layer 410 is a logic-based layer above all sensors to which sensor data are sent in the rawest form to be mapped and placed into the W4 COMN data backbone 420. The data (collected and refined, related and deduplicated, synchronized and disambiguated) are then stored in one or a collection of related databases available to all processes of all applications approved on the W4 COMN. All Network-originating actions and communications are based upon the fields of the data backbone, and some of these actions are such that they themselves become records somewhere in the backbone, e.g. invoicing, while others, e.g. fraud detection, synchronization, disambiguation, can be done without an impact to profiles and models within the backbone.

Actions originating from anything other than the network, e.g., RWEs such as users, locations, proxies and processes, come from the applications layer 414 of the W4 COMN. Some applications can be developed by the W4 COMN operator and appear to be implemented as part of the communications infrastructure 408, e.g. email or calendar programs because of how closely the operate with the sensor processing and user profiling layer 410. The applications 412 also serve some role as a sensor in that they, through their actions, generate data back to the data layer 406 via the data backbone concerning any data created or available due to the applications execution.

The applications layer 414 also provides a personalized user interface (UI) based upon device, network, carrier as well as user-selected or security-based customizations. Any UI can operate within the W4 COMN if it is instrumented to provide data on user interactions or actions back to the network. This is a basic sensor function of any W4 COMN application/UI, and although the W4 COMN can interoperate with applications/UIs that are not instrumented, it is only in a delivery capacity and those applications/UIs would not be able to provide any data (let alone the rich data otherwise available from W4-enabled devices.)

In the case of W4 COMN mobile devices, the UI can also be used to confirm or disambiguate incomplete W4 data in real-time, as well as correlation, triangulation and synchronization sensors for other nearby enabled or non-enabled devices. At some point, the network effects of enough enabled devices allow the network to gather complete or nearly complete data (sufficient for profiling and tracking) of a non-enabled device because of it's regular intersection and sensing by enabled devices in it's real-world location.

Above the applications layer 414 (and sometimes hosted within it) is the communications delivery network(s) 416. This can be operated by the W4 COMN operator or be independent third-party carrier service, but in either case it functions to deliver the data via synchronous or asynchronous communication. In every case, the communication delivery network 414 will be sending or receiving data (e.g., http or IP packets) on behalf of a specific application or network infrastructure 408 request.

The communication delivery layer 418 also has elements that act as sensors including W4 entity extraction from telephone calls, emails, blogs, etc. as well as specific user commands within the delivery network context, e.g., "save and prioritize this call" said before end of call can trigger a recording of the previous conversation to be saved and for the W4 entities within the conversation to analyzed and increased in weighting prioritization decisions in the personalization/user profiling layer 410.

Figure 5:
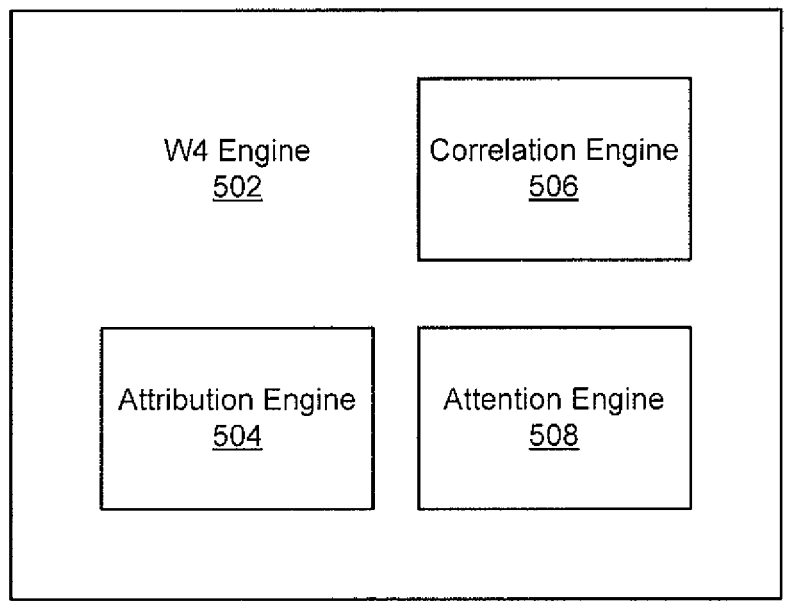
FIG. 5 illustrates an embodiment of analysis components of a W4 engine as shown in FIG. 2.

FIG. 5 illustrates an embodiment of analysis components of a W4 engine as shown in FIG. 3. As discussed above, the W4 Engine is responsible for identifying RWEs and relationships between RWEs and IOs from the data and communication streams passing through the W4 COMN.

In one embodiment the W4 engine connects, interoperates and instruments all network participants through a series of sub-engines that perform different operations in the entity extraction process. One such sub-engine is an attribution engine 504. The attribution engine 504 tracks the real-world ownership, control, publishing or other conditional rights of any RWE in any IO. Whenever a new IO is detected by the W4 engine 502, e.g., through creation or transmission of a new message, a new transaction record, a new image file, etc., ownership is assigned to the IO. The attribution engine 504 creates this ownership information and further allows this information to be determined for each IO known to the W4 COMN.

The W4 engine 502 further includes a correlation engine 506. The correlation engine 506 operates in two capacities: first, to identify associated RWEs and IOs and their relationships (such as by creating a combined graph of any combination of RWEs and IOs and their attributes, relationships and reputations within contexts or situations) and second, as a sensor analytics pre-processor for attention events from any internal or external source.

In one embodiment, the identification of associated RWEs and IOs function of the correlation engine 506 is done by graphing the available data. In this embodiment, a histogram of all RWEs and IOs is created, from which correlations based on the graph can be made. Graphing, or the act of creating a histogram, is a computer science method of identify a distribution of data in order to identify relevant information and make correlations between the data. In a more general mathematical sense, a histogram is simply a mapping $m_i$ that counts the number of observations that fall into various disjoint categories (known as bins), whereas the graph of a histogram is merely one way to represent a histogram. By selecting each IO, RWE, and other known parameters (e.g., times, dates, locations, etc.) as different bins and mapping the available data, relationships between RWEs, IOs and the other parameters can be identified.

As a pre-processor, the correlation engine 506 monitors the information provided by RWEs in order to determine if any conditions are identified that can trigger an action on the part of the W4 engine 502. For example, if a delivery condition has be associated with a message, when the correlation engine 506 determines that the condition is met, it can transmit the appropriate trigger information to the W4 engine 502 that triggers delivery of the message.

The attention engine 508 instruments all appropriate network nodes, clouds, users, applications or any combination thereof and includes close interaction with both the correlation engine 506 and the attribution engine 504.

Figure 6:
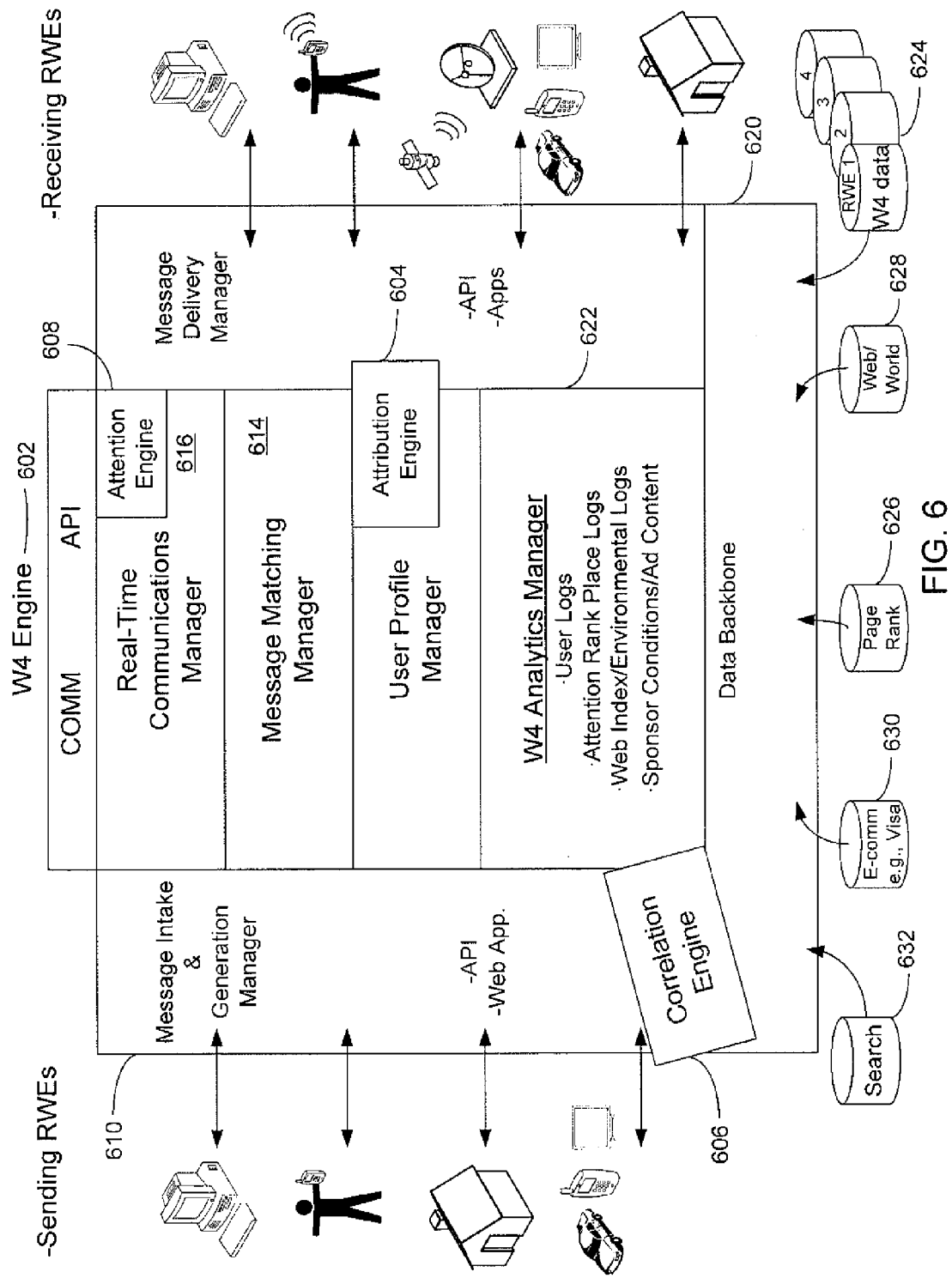
FIG. 6 illustrates an embodiment of a W4 engine showing different components within the sub-engines described generally above with reference to FIG. 5.

FIG. 6 illustrates an embodiment of a W4 engine showing different components within the sub-engines described generally above with reference to FIG. 4. In one embodiment the W4 engine 602 includes an attention engine 608, attribution engine 604 and correlation engine 606 with several sub-managers based upon basic function.

The attention engine 608 includes a message intake and generation manager 610 as well as a message delivery manager 612 that work closely with both a message matching manager 614 and a real-time communications manager 616 to deliver and instrument all communications across the W4 COMN.

The attribution engine 604 works within the user profile manager 618 and in conjunction with all other modules to identify, process/verify and represent ownership and rights information related to RWEs, IOs and combinations thereof.

The correlation engine 606 dumps data from both of its channels (sensors and processes) into the same data backbone 620 which is organized and controlled by the W4 analytics manager 622 and includes both aggregated and individualized archived versions of data from all network operations including user logs 648, attention rank place logs 626, web indices and environmental logs 628, e-commerce and financial transaction information 630, search indexes and logs 632, sponsor content or conditionals, ad copy and any and all other data used in any W4COMN process, IO or event. Because of the amount of data that the W4 COMN will potentially store, the data backbone 620 includes numerous database servers and datastores in communication with the W4 COMN to provide sufficient storage capacity.

As discussed above, the data collected by the W4 COMN includes spatial data, temporal data, RWE interaction data, IO content data (e.g., media data), and user data including explicitly-provided and deduced social and relationship data. Spatial data can be any data identifying a location associated with an RWE. For example, the spatial data can include any passively collected location data, such as cell tower data, global packet radio service (GPRS) data, global positioning service (GPS) data, WI-FI data, personal area network data, IP address data and data from other network access points, or actively collected location data, such as location data entered by the user.

Temporal data is time based data (e.g., time stamps) that relate to specific times and/or events associated with a user and/or the electronic device. For example, the temporal data can be passively collected time data (e.g., time data from a clock resident on the electronic device, or time data from a network clock), or the temporal data can be actively collected time data, such as time data entered by the user of the electronic device (e.g., a user maintained calendar).

The interaction data can be any data associated with user interaction of the electronic device, whether active or passive. Examples of interaction data include interpersonal communication data, media data, relationship data, transactional data and device interaction data, all of which are described in further detail below. Table 1, below, is a non-exhaustive list including examples of electronic data.

TABLE 1

Examples of Electronic Data

| Spatial Data | Temporal Data | Interaction Data |
|---|---|---|
| Cell tower data | Time stamps | Interpersonal |
| GPRS data | Local clock | communication data |

TABLE 1-continued

Examples of Electronic Data

| Spatial Data | Temporal Data | Interaction Data |
|---|---|---|
| GPS data | Network clock | Media data |
| WiFi data | User input of time data | Relationship data |
| Personal area network data | | Transactional data |
| Network access points data | | Device interaction data |
| User input of location data | | |
| Geo-coordinates data | | |

With respect to the interaction data, communications between any RWEs can generate communication data that is transferred via the W4 COMN. For example, the communication data can be any data associated with an incoming or outgoing short message service (SMS) message, email message, voice call (e.g., a cell phone call, a voice over IP call), or other type of interpersonal communication relative to an RWE, such as information regarding who is sending and receiving the communication(s). As described above, communication data can be correlated with, for example, temporal data to deduce information regarding frequency of communications, including concentrated communication patterns, which can indicate user activity information.

Logical and IO data refers to the data contained by an IO as well as data associated with the IO such as creation time, owner, associated RWEs, when the IO was last accessed, etc. If the is a media object, the term media data can be used. Media data call include any data relating to presentable media, such as audio data, visual data, and audiovisual data. For example, the audio data can be data relating to downloaded music, such as genre, artist, album and the like, and includes data regarding ringtones, ringbacks, media purchased, playlists, and media shared, to name a few. The visual data can be data relating to images and/or text received by the electronic device (e.g., via the Internet or other network). The visual data can be data relating to images and/or text sent from and/or captured at the electronic device. The audiovisual data can be data associated with any videos captured at, downloaded to, or otherwise associated with the electronic device. The media data includes media presented to the user via a network, such as use of the Internet, and includes data relating to text entered and/or received by the user using the network (e.g., search terms), and interaction with the network media, such as click data (e.g., advertisement banner clicks, bookmarks, click patterns and the like). Thus, the media data can include data relating to the user's RSS feeds, subscriptions, group memberships, game services, alerts, and the like. The media data also includes non-network activity, such as image capture and/or video capture using an electronic device, such as a mobile phone. The image data can include metadata added by the user, or other data associated with the image, such as, with respect to photos, location when the photos were taken, direction of the shot, content of the shot, and time of day, to name a few. As described in further detail below, media data can be used, for example, to deduce activities information or preferences information, such as cultural and/or buying preferences information.

The relationship data can include data relating to the relationships of an RWE or IO to another RWE or IO. For example, the relationship data can include user identity data, such as gender, age, race, name, social security number, photographs and other information associated with the user's identity. User identity information can also include e-mail addresses, login names and passwords. Relationship data can further include data identifying explicitly associated RWEs.

For example, relationship data for a cell phone can indicate the user that owns the cell phone and the company that provides the service to the phone. As another example, relationship data for a smart car can identify the owner; a credit card associated with the owner for payment of electronic tolls, those users permitted to drive the car and the service station for the car.

Relationship data can also include social network data. Social network data includes data relating to any relationship that is explicitly defined by a user or other RWE, such as data relating to a user's friends, family, co-workers, business relations, and the like. Social network data can include, for example, data corresponding with a user-maintained electronic address book. Relationship data can be correlated with, for example, location data to deduce social network information, such as primary relationships (e.g., user-spouse, user-children and user-parent relationships) or other relationships (e.g., user-friends, user-co-worker, user-business associate relationships). Relationship data also can be utilized to deduce, for example, activities information.

The interaction data can also include transactional data. The transactional data can be any data associated with commercial transactions undertaken by or at the mobile electronic device, such as vendor information, financial institution information (e.g., bank information), financial account information (e.g., credit card information), merchandise information and costs/prices information, and purchase frequency information, to name a few. The transactional data can be utilized, for example, to deduce activities and preferences information. The transactional information can also be used to deduce types of devices and/or services the user owns and/or in which the user can have an interest.

The interaction data can also include device or other RWE interaction data. Such data includes both data generated by interactions between a user and a RWE on the W4 COMN and interactions between the RWE and the W4 COMN. RWE interaction data can be any data relating to an RWE's interaction with the electronic device not included in any of the above categories, such as habitual patterns associated with use of an electronic device data of other modules/applications, such as data regarding which applications are used on an electronic device and how often and when those applications are used. As described in further detail below, device interaction data can be correlated with other data to deduce information regarding user activities and patterns associated therewith. Table 2, below, is a non-exhaustive list including examples of interaction data.

TABLE 2

Examples of Interaction Data

| Type of Data | Example(s) |
|---|---|
| Interpersonal communication data | Text-based communications, such as SMS and e-mail<br>Audio-based communications, such as voice calls, voice notes, voice mail<br>Media-based communications, such as multimedia messaging service (MMS) communications<br>Unique identifiers associated with a communication, such as phone numbers, e-mail addresses, and network addresses |
| Media data | Audio data, such as music data (artist, genre, track, album, etc.)<br>Visual data, such as any text, images and video data, including Internet data, picture data, podcast data and playlist data<br>Network interaction data, such as click patterns and channel viewing patterns |

TABLE 2-continued

Examples of Interaction Data

| Type of Data | Example(s) |
|---|---|
| Relationship data | User identifying information, such as name, age, gender, race, and social security number<br>Social network data |
| Transactional data | Vendors<br>Financial accounts, such as credit cards and banks data<br>Type of merchandise/services purchased<br>Cost of purchases<br>Inventory of purchases |
| Device interaction data | Any data not captured above dealing with user interaction of the device, such as patterns of use of the device, applications utilized, and so forth |

W4 Markup Language

One notable aspect of the W4 COMN is the ability to use the W4 data to allow users to use a more natural and intuitive addressing scheme when sending communications via a communication channel handled by the W4 COMN.

Particularly, this disclosure describes embodiments of a markup language, referred to as the W4 Markup Language, or W4ML for short. W4ML is a markup language useable by both users and developers to invoke W4 COMN operations through a free-form, natural language syntax to enable completely personalized user-defined designations for RWE or IO using names or functional tags to invoke the desired network operation, including addressing network resources, entities or users where the W4ML is augmented by processing with W4 contextual data to disambiguate and translate the W4ML request into an actual W4 COMN channel, process or event.

The W4ML allows personalized designations by users and processes for RWEs and IOs. Contextual addressing is enabled via the use of unique entity identifiers to identify all RWEs, including users (e.g., John Tomac), locations (e.g., latitude 38° 49' 54"N, Longitude 109° 45' 43"W), specific times (e.g., Wednesday, Oct. 31, 2007, 1:00 pm Mountain Time), business entities (Kona Bikes, Inc.) and topics (mountain biking, dinosaurs), based upon W4 data collected by the W4 COMN from prior interactions. Using the correlation engine, W4 data is used to model the relationships between IOs, their content and RWEs, and then between the RWEs. These relationships are then used to lexically scope an address string and map it to its actual form(s) and protocol.

In the W4ML, many forms of address strings could be used, but in a simple embodiment, a user would either say or type "any W4 Something" at (@) "any W4 Something" as an address for any form of communication on any communication channel. Based upon known or implied preferences, the W4 COMN, for example at the message intake manager, would parse the address string and extract identifiers and operator(s) from it. The W4 correlation engine then maps and disambiguates the identifiers to known RWEs or IOs. With the RWEs and IOs identified, the proper communication channel is identified and a channel-specific protocol can be retrieved and used as the address in place of the address string. The communication can then be delivered via the proper communication channel protocol.

For example, a mobile wireless W4 device-using user could say into the device's personal information manager application, "taxi at jfk". In response, the W4 engine would extract the strings "taxi" and "jfk" from his speech as different identifiers related by the conditional operator identifier "at", which are then mapped against the user's calendar entry of an upcoming trip to New York, and connect him live to a taxi company serving the John F. Kennedy Airport if the GPS or cell tower info reports the device's location as in John F. Kennedy Airport. Alternatively, if he was not physically in New York, it can look up the user's actual travel reservation and flight arrival times, search for preferred taxis and limos serving JFK Airport, send a text to the device saying "Taxis available by Baggage Claim Carousel 3, or a limo can be booked for pick up at same location. Book Y or N?"

In another example, a user could type into her W4 COMN-enabled email application as an address string "debby@projectblue". In response, the W4 engine would extract the strings "debby" and "projectblue" from the address string and a text analyzer would separate "project" and "blue" into two strings. Using W4 data of the user's recent email traffic would reveal that "project blue" is an internal code name (i.e. an identified topic) for upgrading company hardware and that a lot of email traffic has gone back and forth with a vendor's representative named Deborah Smith on this topic. A explicit relationship between Deborah Smith and the string "Debby" can be found in prior messages addressed to Deborah Smith's email address but starting with salutations containing "Debby", or all implicit relationship be found by consulting a list of proper name synonyms that associates Deborah and Debby. Further W4 extraction from meeting notes can find additional references to Deborah as Debby. In an embodiment, the W4 engine can return Deborah's actual email address to the device, which can replace it either in the actual editor (thus showing the actual address to the user) or once the send button has been hit.

Lexical scoping refers to the setting the scope of a variable within a context or sub-context. By defining the value of a given variable within the selected context in terms of its W4 data model, it is possible to use W4 entities as the nodes in a logical network for addressing any person, place or topic with reference to known W4 information about the subject of the addressing request. Unlike alias systems currently known, this contextual addressing neither requires the same alias/address string to be used in every request, nor for any alias to be explicitly registered as an alias before using. Instead, non-unique identifiers can be used in natural ways that provide faster and freer communication because less (or no) time is spent worrying about, looking up and making sure the proper protocols are used in order to send a communication across a communication channel.

In the embodiments described above, the phrase "at" and symbol "@" are used to separate the identifiers in the address string. For the purposes of this disclosure, such phrases and symbols are referred to as conditional operators, or simply "conditionals". Any symbol can be used as long as the W4 COMN can recognize and understand the symbol as being part of the defined conditional operator identifiers and syntax. Conditional operators can serve multiple purposes in an address string. One purpose is to separate the different identifiers so that they can be parsed by the W4 COMN. Another purpose is define a contextual relationship between the two identifiers.

In the W4ML, many different conditional operators can be used, each one signifying a different relationship type between the descriptor elements of an address string. In an embodiment, three distinct different relationship types are identified by groups of conditional operators, namely: delivery condition operators that identify a delivery condition; relationship identifiers that identify relationships between two descriptors that must be met in order to determine where an associated communication should be transmitted; and channel identification operators that identify what communication channel should be used to deliver a communication. Each of these specific conditional operators will be discussed in further detail below.

Conditional operators can take the form of single character symbols that in some cases can be recognizable to the users automatically as having some meaning. For example, the commonly used @ symbol can be used as a delivery condition operator indicating location. Other single character symbols can also be used or assigned to different things so that the user can get accustomed to the syntax. After the user has memorized the various symbols, the ability for the user to quickly type out an address string to define exactly how a communication should be transmitted will be very easy. Other ways of identifying conditional operators can also be used, such as using real words as conditional operators, but set off by some other character from the descriptors in the address string. For example, conditional operators can be indicated within brackets so that an exemplary address string can be "John[at]thegrocerystore". In this case the "[at]" operator is four characters that are interpreted by the address parsing engine as a conditional operator. In this embodiment, any type of phrase or term can be used as a conditional operator. For example, the word "near" can be used within brackets to indicate a default distance from some descriptor. Furthermore, "[within 10 miles]" or "[w/in 10mi]" are examples of operators that can be interpreted by the W4 COMN that the recipient should be within 10 miles of some specified location. Many other phrases and words can be used within brackets that are easily understandable and interpretable by users as conditional operators such as the words after, before, within, living at, located at, friend of, family of, if, etc.

The delivery condition operators are used to identify a delivery condition in an address string. For example, an address string can consist of a descriptor followed by a delivery condition operator (e.g. @, a, &, %,ˆ, * . . . ), Any symbol can be used for a conditional operator as long as the defined syntax of the mark up language is able to recognize that symbol and interpret it as appropriates. Delivery condition operators can include an operator that signifies that the communication should be delivered to its identified recipient (identified by a descriptor based on the syntax) when that recipient is physically at a location specified by a second descriptor. An example of the use of this delivery condition operator would be to instruct the system to deliver a communication to a person when that person is at a specified grocery store. The uses of such a delivery condition operator are clear, it allows the sender to dictate where the recipient should be when the recipient receives the communication. Another delivery condition operator is one that specifies a time and date. For this operator some specified symbol can be defined in the syntax which indicates to the system that a time and date which is also provided as a descriptor in some location in the address string to deliver the message to. An example of such an address string would be "John*10:30pmNov. 11,2008". In this example the * indicates that the time and date following the star is the time and date at which the communication associated with the address string is to be delivered.

Yet another delivery condition operator example is a "before" operator, indicating that a communication should be delivered before a time and date specified by some descriptor in the address string. In this situation, if the system is unable to deliver the communication before the time designated by the appropriate descriptor the communication will not be delivered at all. In an embodiment, if the communication is not delivered the sender can be notified.

Yet another delivery condition operator example is a "within time period" operator that designates that a communication should be delivered within some time period identified by the descriptor in the address string. Another delivery condition operator example is an "after location" operator that indicates to the system that a communication should be delivered only after an identified recipient has left a specific location. A general delivery condition operator can also be defined. Such a delivery condition operator can be considered an "if" statement that identifies some generic or specific condition that must be met.

In an embodiment of the if conditional operator, the if operator can be identified by a symbol or the letters "if", and followed by two descriptors that are used to identify the if condition. Yet another conditional operator can be associated with the if conditional operator such as an equal sign or a hyphen. For example, an if operator can appear "if(first descriptor=second descriptor)". Such a delivery condition operator can be interpreted so that when the condition defined by the first descriptor being equal to the second descriptor is detected, the communication associated with the address string is delivered to the recipient. Such a delivery condition operator allows for senders to identify such conditions as, for example, deliver the communication only when it is raining at a location, only when it is snowing at a location, only when there is traffic at a location, only if a specified sporting team wins a game, or only if some person other than the recipient is at a location. The reader will realize that the delivery condition operator allows for any of the prior delivery condition operators to be recreated in a more generic form.

For example, for a time delivery condition, the "if" operator could be used with a statement such as "if(time=10:30pm-Nov. 11, 2008)" instead of the time condition operator followed by a descriptor identifying the time. However, the "if" condition operator is useful in generating messages automatically upon the detection of different conditions by the W4 COMN. Thus, for example, a message originator or sender can construct a message identifying the sender as a recipient, the message using the if operator, so that when the sender's child arrives at a specific location as detected by the W4 COMN, a message will be automatically generated and sent to the sender, or to some other recipient, indicating that the W4 COMN has detected that the child has arrived at the specified location. Because of the depth of the W4 data available to the W4 COMN, many different conditions can be created through the use of the "if" conditional operator.

By way of further example, an "if" conditional operator could identify that a message be delivered if a specified person is purchasing gas at a particular gas station, the message identifying items on sale at the gas station's associated convenience store, or offering a discount coupon on any purchase, for instance. An entire advertising campaign can be built simply by an advertiser sending a message (or group of messages) to the W4 COMN on the order of: "if (mailrecipient@quickgas)", with mailrecipient being an email address or sums number of a person. Other examples of how the if condition operator can be used will be immediately recognized by the reader.

Another type of conditional operator is the "relationship" operator. Many different relationship operators can be defined and used in the W4ML syntax. In an embodiment, a first relationship operator can be the symbol "e" to indicate an employment relationship. An example of the use of such an operator is "Johnesamsclub". In this example, the W4 COMN will parse the string and determine that the communication should be transmitted to a person Snatching the name who is employed by the company Sam's Club. If based on the relationships of the W4 data it can be resolved that the sender knows a John who can be determined to be employed by Sam's Club, then the address string can be resolved and the communication sent to the John so identified.

Another relationship operator can be an operator indicating a "living at" relationship. Such an operator indicates that the message should be sent to a recipient that is living at some specified location, place, or other recognizable RWE. For example, an address string could be "John#taborcenter". Such a string could be parsed to determine that the communication should be transmitted to a John living at the building known as Tabor Center. Upon parsing this address string the W4 COMN can analyze the W4 data to determine if the sender knows a person associated with the name John who lives at an address associates the phrase Tabor Center. In an embodiment, the Tabor Center can be the name of a building that is an RWE known to the W4 COMN. By correlating the W4 data related to the sender, a John whose mailing address is at the Tabor Center can be identified and the communication transmitted to that John via some communication channel.

Yet another relationship operator can be an operator indicating a "telephone number", an email address, or some other unique communication channel identifier. For example, the address string "John%3035556611" will indicate that the communication should be transmitted the John who has the telephone number 303-555-6611. Likewise, a conditional operator can be used to identify an email address or a general conditional operator can used that indicates that a following descriptor or related descriptor is a channel specific identifier. In the examples just described the communication need not be delivered by the communication channel identified in the address string. For example, the address string "John%3035556611" if used as the address string for an email communication will cause an email to be transmitted to the email address associated with the John whose phone number is 303-555-6611, or could be a text message sent via SMS to the cell phone with that number. As with any of the conditional operators described herein, if the W4 COMN can not disambiguate the address string in order to identify a specific recipient the sender can be notified and requested to provide additional information or requested to select between several potential recipients in order to complete disambiguation of the address string. For example, the W4 COMN can not be aware of an email address for the John at 303-555-6611, in which case the W4 COMN would return to the sender an error message indicating no email address for this John is available.

Yet another relationship operator can signify that a person identified by one descriptor is a "friend" of a person identified by a second descriptor in the address string. For example, the address string "John!Wendy" can be used to identify John who is a known friend of the person Wendy. Assuming that the W4 COMN can disambiguate Wendy or a descriptor which designates the friend of the recipient, then the W4 COMN can disambiguate John, the recipient, and transmit the communication based on the address string. For example, the "friend" conditional operator can be used in conjunction with a unique identifier of some kind for the friend. For example, "John!3035551111" could be used to identify that the communication is to be transmitted to the John who is a friend of the person who is identified by the phone number 303-555-1111. In an embodiment, in this situation where the W4 COMN can disambiguate Wendy as associated with the telephone number 303-555-1111, then both of the provided examples will result in the communication being delivered to the same John, and will be considered by the W4 COMN to be equivalent addresses.

Yet another relationship operator can be based on "family" relationships. For example, an operator can be used to designate that a recipient is the father of the person, or the mother of the person, or the son or spouse or sister of a person. Different operators could be provided for any and all family relationship or a generic family operator "fam" or "fm" can be provided. Thus, through the mark up language, it would be possible for a sender to transmit a message to the father of a known person "Frank" even if the sender does not know the appropriate channel specific communication identifiers for the person who is the sought after father. W4 COMN could identify "fatherfmFrank" as the address of Frank's father.

Another type of conditional operator is a channel delivery operator or a channel designator. Such an operator or operators can designate what channel the associated communication should be delivered on. For example, a user can type a message using an email application, however address that message to a telephone or some audio or visual communication channel for delivery. An example of a communication designating operator is the phrase "byphone". In this embodiment, an address string can appear as "Johnbyphone". When this address string is parsed the phrase "byphone" will be identified as an operator indicating that the message should be delivered the recipient identified by John and delivered by means of the telephone. Once the term John is disambiguated to cause a communication regardless of its type, for example if it is a text communication it can be sent via SMS or rendered through a text to a known text-to-speech engine into audio information, it is then transmitted to the telephone number associated with John. Other examples of a delivery channel operator include an operator who identifies that a communication should be delivered by email, in which case regardless of the content of the communication (e.g. audio, visual, textual), the communication will be delivered in or as an attachment to an email message to the identified recipient. A conditional operator can further be defined to indicate that a communication should be sent by facsimile. This allows someone to create an address string such as "Johnbyfax" to indicate that the communication, regardless of how it was textual or documentary, should be transmitted to John by Fax number, this allows a sender to send communication by fax even if the sender does not have the recipient's fax number.

In the discussions above, non-unique descriptors such as "John" and "Wendy" were used as generic descriptors in the examples. Any descriptor could be used, and need not be non-unique. For example, an email address or a telephone number could be used in any descriptor. This is a unique descriptor that can be uniquely resolved by the W4 COMN to a specific RWE. Once that RWE has been identified, other unique channel specific identifiers such as telephone numbers, fax numbers, addresses, email addresses, etc. can be identified by the W4 COMN even if such addresses are not known by the sender. In the embodiments described above, the conditional operators all require a defined and known syntax in order for their use to be interpreted by the W4 COMN. Such a syntax will define how each operator relates to the descriptors in different parts of the address string.

In most of the examples provided above, operators typically separate descriptors within an address string allowing the address string to be parsed by looking for operators, and after identifying the operators, knowing that the discrete elements remaining are descriptors. Other methods of separating or identifying operators within an address string, or separating and identifying descriptors within an address string can also be used. For example, descriptors can be comma or dash delimited and an operator can appear before or after the set of descriptors. Other delimitating techniques can also be used in a syntax. For example, operators can be set out within brackets to assist the address parsing engine of the W4 COMN in identifying specific operators so that an operator is not confused with a descriptor. For example, operators can be surrounded by brackets if they are textual, in which case the brackets and the text together can be considered a single conditional operator (e.g. [by phone] or [attime]).

The syntax further allows and defines how the operators and descriptors can be nested and combined to create more complicate address strings. One technique of doing this is the parentheses technique which similar to some computing languages allows strings which are to be considered together as a single unit to be set off within parentheses so that nested strings within parentheses can be created and parsed by the address parsing engine. An example of a simple nesting syntax is "descriptor1!(descriptor2[employedby]descriptor3)@starbucks". In this example, a complex address string indicates that the recipient as identified by descriptor 1 is a friend of the person identified by descriptor 2, that person is employed by the entity described by descriptor 3. In addition, a delivery condition operator has been provided that indicates that the communication should only be delivered to the recipient when the recipient is at Starbucks. This example illustrates how the syntax and delivery condition operators of the mark up language can be defined in such a way to allow for complicated address strings and delivery conditions to be created dictating how, when, to whom, and where, and by what channel communications are to be delivered. As such the mark up language provides a powerful method for addressing any types of communication easily and within a single string, and can also take leverage the use of W4 data so that communication can be delivered easily and effectively.

Figure 7:
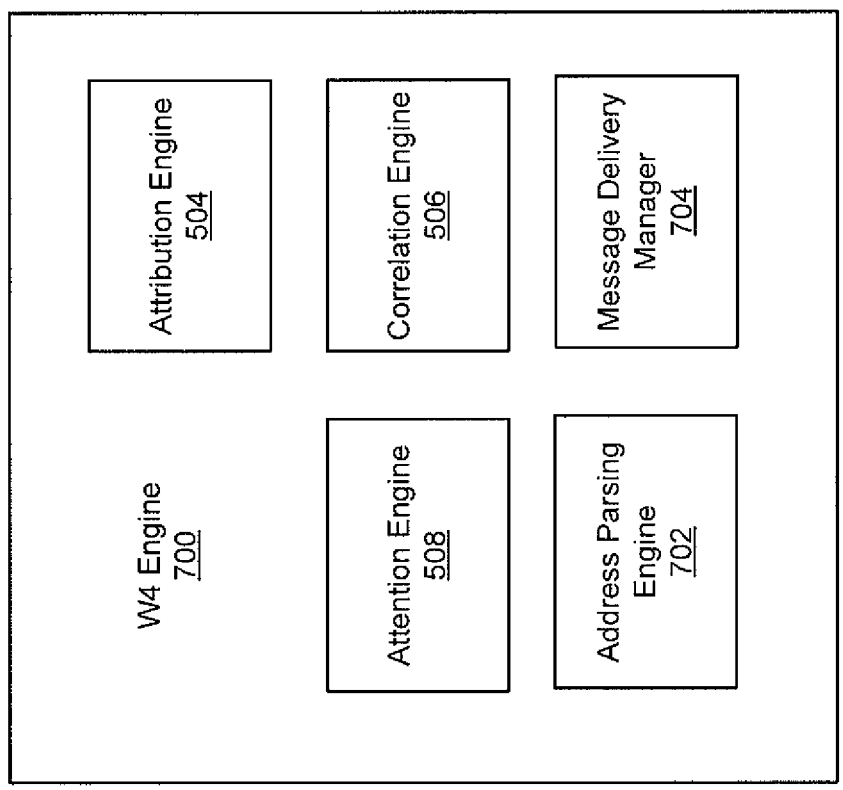
FIG. 7 illustrates elements of an embodiment of a W4 engine adapted to evaluate communications addressed used the W4 markup language.

FIG. 7 illustrates elements of an embodiment of a W4 engine adapted to perform W4 addressing as described herein. The W4 engine 700 is adapted to receive address strings containing two or more entity identifiers or descriptors associated by at least one conditional operator as described above. In an embodiment, address strings such as "descriptor1[conditional operator]descriptor2" can be used. The W4 engine, using correlations made from W4 data, ultimately selects an RWE as the most likely RWE identified by each descriptor and then interprets the address in order to determine how the associated communication should be delivered.

The W4 engine 700 includes a correlation engine 506, an attribution engine 504 and an attention engine 508 as described above. In the embodiment shown, the correlation engine 506, based on the correlations between IOs and RWEs as described below, identifies relationships between the RWEs known to the W4 COMN, The relationships can be determined in response to a request to deliver a message, triggered by some other input, or can be automatically determined by the correlation engine on a periodic basis and stored for later real-time use.

The correlation and comparison process performed by the correlation engine 506 to generate a probability score can include determining relationships between parties, topics, locations, etc. in part though the W4 COMN's identification of each RWE by a unique identifier and storage of information about the past interactions by those RWEs. The actual values obtained as probability scores can vary depending on the calculations performed and weighting factors used. Any suitable method or algorithm for generating a value from different relationships identified in the data can be used. For example, all probabilities can be normalized to some scale or can be aggregated without normalization. This disclosure describes probability scores as "higher" to indicate that there is a higher likelihood that an RWE is identified or that there are relatively more and/or stronger relationships between the RWE and the other information associated with the address string in comparison with other RWEs. The reader will understand that other numerical scales, comparison mechanisms or systems can be used in order to compare the relationships in W4 data between RWEs in order to arrive at a relative ranking or probability based on those relationships.

In an embodiment, the W4 data are processed and analyzed using data models that treat data not as abstract signals stored in databases, but rather as IOs that represent RWEs that actually exist, have existed, or will exist in real space, real time, and are real people, objects, places, times, and/or events. As such, the data model for W4 IOs that represent W4 RWEs (Where/When/Who/What) will model not only the signals recorded from the RWEs or about the RWEs, but also represent these RWEs and their interactions in ways that model the affordances and constraints of entities and activities in the physical world. A notable aspect is the modeling of data about RWEs as embodied and situated in real world contexts so that the computation of similarity, clustering, distance, and inference take into account the states and actions of RWEs in the real world and the contexts and patterns of these states and actions.

For example, for temporal data the computation of temporal distance and similarity in a W4 data model cannot merely treat time as a linear function, The temporal distance and similarity between two times is dependent not only on the absolute linear temporal delta between them (e.g., the number of hours between "Tuesday, November 20, 4:00 pm Pacific Time" and "Tuesday, November 20, 7:00 pm Pacific Time"), but even more so is dependent on the context and activities that condition the significance of these times in the physical world and the other W4 RWEs (people, places, objects, and events) etc.) associated with them. For example, in terms of distance and similarity, "Tuesday, November 20, 4:00 pm Pacific Time" and "Tuesday, November 27, 4:00 pm Pacific Time" can be modeled as closer together in a W4 temporal data model than "Tuesday, November 20, 4:00 pm Pacific Time" and "Tuesday, November 20, 7:00 pm Pacific Time" because of the weekly meeting that happens every Tuesday at work at 4:00 pm vs. the dinner at home with family that happens at 7 pm on Tuesdays. Contextual and periodic patterns in time can be important to the modeling of temporal data in a W4 data model.

An even simpler temporal data modeling issue is to model the various periodic patterns of daily life such as day and night (and sub-periods within them such as morning, noon, afternoon, evening, etc.) and the distinction between the workweek and the weekend. In addition, salient periods such as seasons of the year and salient events such as holidays also affect the modeling of temporal data to determine similarity and distance. Furthermore, the modeling of temporal data for IOs that represent RWEs should correlate temporal, spatial, and weather data to account for the physical condition of times at different points on the planet. Different latitudes have different amounts of daylight and even are opposite between the northern and southern hemispheres. Similar contextual and structural data modeling issues arise in modeling data from and about the RWEs for people, groups of people, objects, places, and events.

With appropriate data models for IOs that represent data from or about RWEs, a variety of machine learning techniques can be applied to analyze the W4 data. In an embodiment, W4 data can modeled as a "feature vector" in which the vector includes not only raw sensed data from or about W4 RWEs, but also higher order features that account for the contextual and periodic patterns of the states and action of W4 RWEs. Each of these features in the feature vector can have a numeric or symbolic value that can be compared for similarity to other numeric or symbolic values in a feature space. Each feature can also be modeled with an additional value from 0 to 1 (a certainty value) to represent the probability that the feature is true. By modeling W4 data about RWEs in ways that account for the affordances and constraints of their context and patterns in the physical world in features and higher order features with or without certainty values, this data (whether represented in feature vectors or by other data modeling techniques) can then be processed to determine similarity, difference, clustering, hierarchical and graph relationships, as well as inferential relationships among the features and feature vectors.

A wide variety of statistical and machine learning techniques can be applied to W4 data, from simple histograms to Sparse Factor Analysis (SFA), Hidden Markov Models (HMMs), Support Vector Machines (SVMs), Bayesian Methods, etc. Such learning algorithms can be populated with data models that contain features and higher order features represent not just the "content" of the signals stored as IOs, e.g., the raw W4 data, but also model the contexts and patterns of the RWEs that exist, have existed, or will exist in the physical world from which these data have been captured.

Based on the probability scores generated for the RWE combinations from the relationships identified from the graphed W4 data, a selection of one or more RWE combinations is made in a selection operation as described below with reference to FIG. 8. Depending on the scope of analyses performed in the process of generating the probability score, the selection can be a simple operation of selecting the RWE or RWE(s) with the highest probability.

In addition, the W4 engine 700 includes an address parsing engine 702 that parses the address string and disambiguates the various descriptors in the address string. From the results, the appropriate recipient and delivery conditions, if any, are determined.

In an embodiment, the address parsing engine 702 generates a probability for each of RWE and descriptor combination as described in greater detail below. That is, for each RWE a probability is generated that describes probability that the RWE is the RWE that the sender of the communication meant to identify by the particular identifier. For example, for the address string "debby[employedby]projectblue", a first probability is determined for each RWE known to the system that that RWE is the "debby" and that that RWE is the "projectblue". An aggregate probability can then be determined for the address string as a whole based on the probabilities for each identifier.

The probabilities are determined from the relationships identified by the correlation engine 506 between RWEs by analyzing and mapping the W4 data. As the correlation engine 506 can identify many different relationships between the RWEs, for example one or more different location relationships, social relationships, topic relationships, etc., the probabilities can be determined by ascribing different weights to the different relationships based on a predetermination of their relative importance by relationship type and strength, or relative importance to a specific context or addressing request.

Based on the determined probabilities, a selection is made of the most likely RWE for each descriptor in the string. Then a second analysis is performed to determine if the relationships between the selected RWEs are sufficiently strong to warrant delivery of the associated communication to the recipient identifier. For example, for the address string "debby[employedby]projectblue", if it is determined that there is a current, strong relationship between the RWE selected as most likely to be "debby" and the RWE most likely to be "projectblue" (e.g., debby is currently a manager at Project Blue), then the communication can be delivered immediately.

Alternatively, if the conditional operator is a delivery condition operator, and it is determined to be a delivery condition that has not occurred, e.g., the second descriptor is an RWE that is a location, or a time or event, for which is there is not currently a strong relationship between the recipient and the delivery condition, the communication can be delayed until a strong relationship between the two entities is detected by the correlation engine. For example, for the address string "debby[atlocation]grocerystore" if it is determined that there is not a current, strong relationship between the RWE selected as most likely to be "debby" and the RWE most likely to be "grocerystore" (e.g., Debby is not currently at or near Debby's usual grocery store), then the communication should not be delivered until the W4 COMN confirms that debby is at her local grocery store (e.g., by tracking the location of Debby's associated devices or by a report from geographic location sensor).

Once the RWEs are selected by the addressing engine, the communication is delivered, either immediately or upon detection that the delivery condition(s) have been met, by the message delivery manager 704. In an embodiment, the message delivery manager can also select a communication channel, and appropriate channel-specific address for the selected recipient, for delivery of the message. For example, an address string can be provided by voice command from a user into a smart phone connected to the W4 COMN. Using the information that the address string was provided by voice command, the message delivery manager 704 can interpret this as a request to initial a telephone conversation with the recipient, in which case the message delivery manager 704 can retrieve the telephone number for the selected recipient and initiate a call from the user's smart phone to the telephone number. Alternatively, the user can have entered the address string in an email, in which case the message delivery manager 704 can retrieve the email address for the selected recipient and transmit the message via email.

In addition, as RWEs can have multiple channel-specific addresses/identifiers (e.g., work email address, personal email address, work telephone number, personal telephone, work address, home address, etc.), the message delivery manager 704 can select the most appropriate address based on context of the address string and the relationships between the RWEs. For example, the address strings "debby[employedby]projectblue" and "debby[at]grocerystore", even when used by the same sender, can result in messages being sent to two different addresses, possibly by two different communication channels and two different devices associated with "debby". The first string can result in an email being sent to Debby's work email address on her employer's email server (which is an RWE strongly associated with Debby and Project Blue based on prior emails). The second string can result in a text message being transmitted to Debby's cell phone or one of Debby's other mobile devices upon determination that that device is near a grocery store.

Selection of the delivery channel and appropriate address/identifier on that channel can be made by the delivery channel as described above based on information provided by the correlation engine 506. Alternatively, the delivery channel and address selection can be made by the addressing engine as part of the determination of probabilities, in which case the message delivery manager's primarily task will be only delivery of the message when/if the delivery condition is met.

Figure 8:
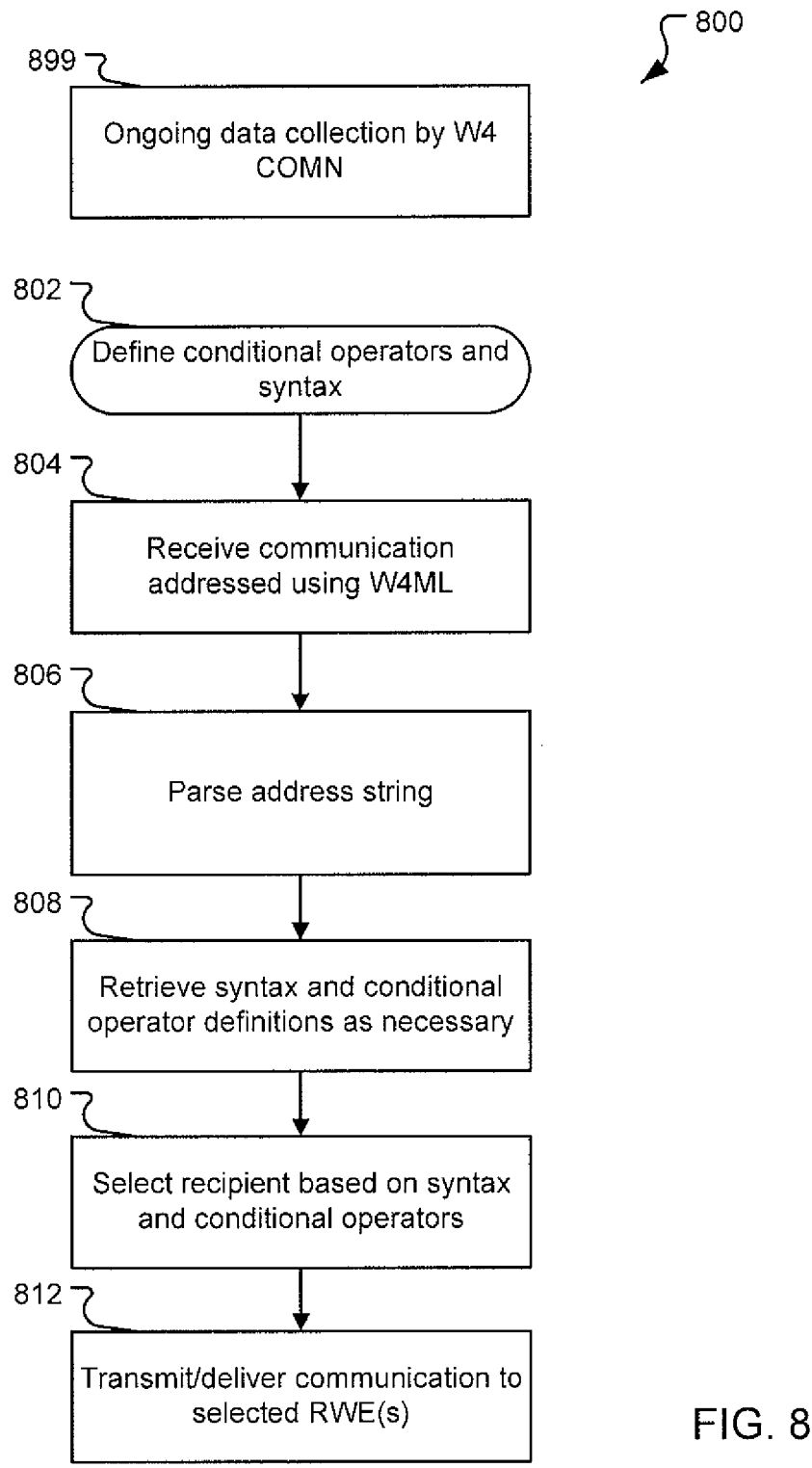
FIG. 8 illustrates an embodiment of a method for addressing, transmitting and delivering information objects over a network based on temporal, spatial and topical data for entities on the network.

FIG. 8 is an illustration of an embodiment of a method for transmitting information objects based on addresses constructed using the W4ML. The method commences as part of ongoing data collection for W4 COMN at operation 899.

As described above, one aspect of the W4 COMN that allows for addressing in the manner described is the ongoing collection and maintenance of W4 data from the RWEs interacting with the network. In an embodiment, this collection and maintenance is an independent and ongoing operation 899 of the W4 COMN, and thus current W4 social, temporal, spatial and topical data are always available for use in addressing. In addition, part of this data collection operation 899 includes the determination of ownership and the association of different RWEs with different IOs as described above. Therefore, each IO is owned/controlled by at least one RWE with a known, unique identifier on the W4 COMN and each IO can have many other associations with other RWEs that are known to the W4 COMN.

The method 800 further includes the definition of the mark up language including its syntax and each conditional operator that is available. In a definition operation 802 each conditional operator that will be recognized by the address parsing engine is defined as well as the syntax in which the operator is to be used within an address string. In other words, operation 802 represents the pre-selecting of the syntax and symbols that will represent conditional operators, rules for how to parse messages containing conditional operators. In an embodiment, the definition operation 802 can allow various users and/or developers to define their own syntax and conditional operators based on the W4 data available. Users and developers can be utilize the teachings herein to create and assign various symbols or strings of text to different functions which can be used as conditional operators after the conditional operators and syntax of the markup language have been defined, and that information conveyed to the address parsing engine so that it can now parse addresses. In the embodiment shown, a transmission request is received from a sender in a receive communication addressed using W4ML operation 804.

Such a request can be generated by software on a computing device operated by a user or by a "dumb" device such as a cellular phone or a sensor directed by a user. In an embodiment, the address string can be part of a communication request, such as a request to deliver a message, a request to initiate a telephone call or some other two-way communication link or a request to transmit data to a recipient. In such as situation, the address string is associated with the IO that is to be delivered and can also be a part of that IO. A request can also occur upon detection of an address string, such as for example, a user entering an address string into a field in an email composition screen or speaking an address string into a microphone on a device.

In the method 800, the address string, as described above, includes two or more descriptors and at least one conditional operator, such as "Debby!Wendy" as described in greater detail herein. The descriptors can be unique channel-specific identifiers such as email addresses or telephone numbers, non-unique identifiers, aliases (i.e., predefined substitutes for a channel-specific identifier), or unique W4 identifiers. For the purposes of this disclosure, it is assumed that at least one, if not all, of the descriptors in the string are non-unique identifiers that cannot be simply resolved by the use of a lookup table or some other predetermined aliasing or forwarding method. The term descriptor as used herein indicates an element of the address string that is intended to identify an RWE or some condition or status of a delivery condition.

In an embodiment, the address string can be considered to be detected when it is received from an RWE or a process which will be referred to as the sender, although the reader will understand that the communication can not have actually been sent at the time of receipt of the address string. It is anticipated that under most circumstances that the sender will already be known to the W4 COMN and provided with a unique W4 identifier as well as at least one communication channel-specific address (which is another form of unique identifier). In addition, it should be noted that multiple RWEs can identified as senders of a single message, e.g., the computing device generating the message, the user of the computing device if known, and a business associated with the user and the computing device, etc.

The receive address string operation 804 can include receiving an actual IO (e.g., message file or text) from an RWE or an IO such as a email software being executed by an RWE, the IO to be transmitted as directed by the address string. The IO can contain data such as the text or contents of the communication as well as additional information in the form of metadata. The data contained can be evaluated in order to identify additional RWEs associated with the communication as well as identifying a topic of the communication or resolving or verifying specific aliases connected with the data.

The receive address string operation 804 can also include an initial analysis of the address string and any IO data, if available, in order to identify such things as the topic of the event and identification of other RWEs referred to in the communication (e.g., people listed in text of a message but that are neither the sender nor a recipient) or other IOs (e.g., hyperlinks to IOs, attachments, etc.) contained in the communication.

The receive address string operation 804 can be considered to occur at any point in the delivery chain within the W4 COMN, e.g., by any one of the engines used to conduct IO intake, routing or delivery. For example, depending on how the implementers of the W4 COMN choose to implement the network functions, an address string can be received and initially analyzed and information routed to the correlation engine and addressing engine by any one of the message intake and generation manager, user profile manager, message delivery manager or any other engine or manager in the W4 COMN's communication delivery chain.

After the address string associated with the communication has been received in receiving operation 804, a parsing operation 806 is performed. The parsing operation 806 is performed upon the detection of an address string matching the syntax of the W4ML. Upon detection of such a string, the parsing operation 806 examines the string and parses out the descriptors and conditional operators and any nesting information within the address string. By then retrieving the definitions of each of the conditional operators found in the address string as necessary in operation 808, and the parsing of the string based on the syntax the various relationships, delivery conditions, identification, and other relationship types between the various descriptors as dictated by the syntax are identified. After the address string has been parsed and relationship information identified by the address string has been determined, the address string is then analyzed and a recipient and any delivery conditions are determined. This is illustrated in a select recipient based on syntax and conditional operators operation 810.

The selection operation 810 includes the analyses and determinations necessary in order to disambiguate any non-unique identifiers that are used as descriptors in the address string. Any suitable method for disambiguating non-unique identifiers can be used. The disambiguation is performed using the W4 data set available for W4 COMN, and allows various correlations to be made between information obtained from different communication networks as described above. In some cases the address string must be disambiguated based on the conditional operation contained in the mark up language. In other cases no disambiguation is necessary and the conditional operators contained in the address string are simply provided in order to identify delivery conditions and delivery channels. For example, in an embodiment, it can be determined upon parsing an address string that a conditional operator specifies a relationship between two descriptors contained in the address string (e.g. "John!Wendy"). In this case, since it is determined that the conditional operator "!" identifies a relationship between the two descriptors, each descriptor must then be disambiguated if that descriptor is a non-unique identifier such as John and Wendy. However, if either descriptor is a unique identifier of some kind, e.g. a telephone number, an email address, a complete email address, etc., disambiguation of the non-unique identifier need not be performed. In such an example as this, it is likely that one of the two descriptors provided is either easily disambiguated or is a unique identifier of some kind thus allowing the other descriptor to be disambiguated (e.g. the recipient to be disambiguated).

In an embodiment, the disambiguation can include identifying a set of RWEs that match each descriptor and then identifying relationships between the RWEs. From this relationship information one of the RWEs, or the descriptor associated with the actual recipient of the communication (as determined by the syntax), can be identified and selected in a set of RWEs. As described above, disambiguation includes comparing such information as the content of the actual descriptor and information known about the RWEs as well as the relationships between the RWEs as determined by the W4 data. In an embodiment, a probability score can be generated for each RWE associated with the recipient descriptor and if a probability score above a certain threshold is determined, the system my automatically transmit the communication to that recipient. Alternatively, if the probability scores are not high enough to indicate a substantial probability that an RWE is the actual intended recipient of the communication the sender can be prompted for more information or an error can be returned that the address string can not be disambiguated.

The selection operation 810 can include retrieving a unique identifier for the RWE identified as the recipient from a set of unique identifiers associated with that recipient in the W4 data. The identifier retrieved will be the appropriate channel specific identifier for the communication channel upon which the communication is to be transmitted. For example, if a conditional operation specifying that the communication should be transmitted by facsimile is included in the address string, the method will retrieve the fax number for the recipient RWE. In short, once a recipient and/or conditions for delivery are resolved, operation 812 can occur in which the communication is transmitted, delivered or otherwise communicated to the selected RWE(s) intended by the sender.

After the selection operation 810, a delivery operation 812 is performed in which the communication associated with the address string is transmitted to the selected recipient(s) in accordance with the identified delivery conditions. The delivery operation 812 can take the form of opening a voice or video data connection between the sender's device and a device associated with the recipient. Alternatively, the delivery operation 812 can take the form of transmitting a message in the form of an IO or other data from the sender's device to a device associated with the recipient.

If a delivery condition is determined that indicates a communication should be delivered immediately, then the transmission will occur without delay. However, if a delivery condition has been determined that indicates some thing must first occur before the communication should be delivered, then the delivery operation 812 will monitor the W4 data associated with the delivery condition (e.g., the location of the recipient, the time, etc.) until the condition is met and then deliver the communication.

The delivery operation 812 can include retrieving a unique channel specific-identifier (e.g., a telephone number, an email address, etc.) for the communication channel and device selected for delivery of the message. Such a unique channel specific-identifier can be selected from the group of unique channel specific-identifiers for devices, accounts, etc. associated with the identified recipient based on the unique W4 identifier of the recipient and the device RWEs associated with the recipient in the W4 data.

Those skilled in the art will recognize that the methods and systems of the present disclosure can be implemented in many manners and as such are not to be limited by the foregoing exemplary embodiments and examples. In other words, functional elements being performed by single or multiple components, in various combinations of hardware and software or firmware, and individual functions, can be distributed among software applications at either the client level or server level or both. In this regard, any number of the features of the different embodiments described herein can be combined into single or multiple embodiments, and alternate embodiments having fewer than, or more than, all of the features described herein are possible. Functionality can also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that can be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications can be made to the elements and operations described above to obtain a result that remains within the scope of the systems and processes described in this disclosure. For example, the prompting that Occurs in the addressing method allows a user to use the W4 addressing method as a type of search system that returns a listing of one more services with strong relationships to the user based on the user's and services' W4 data. For example, address strings such as "pizza[in]santacruz" and "hotel[w/i10miles]lax" can be used to cause the W4 COMN to provide listings of service providers for pizza in Santa Cruz or hotels within 10 miles of the Los Angeles Airport and instantly open communications with them. Numerous other changes can be made that will readily suggest themselves to those skilled in the art and which are encompassed in the spirit of the disclosure and as defined in the appended claims.

What is claimed is:

1. A method comprising:

defining, via a computing device, a user-defined markup language, the user-defined markup language comprising a plurality of user-defined conditional operators, each user-defined conditional operator of the plurality of user-defined conditional operators defining a respective relationship type and being associated with a respective syntax, such that the user-defined markup language is defined in response to receiving data relating to the plurality of user-defined conditional operators from a user;

receiving, at the computing device, a request from a sender real-world entity (RWE) to deliver a first information object (IO) to a recipient RWE identified by an address string;

parsing, via the computing device, the address string to identify at least a first address string descriptor, a second address string descriptor and an address string conditional operator, such that the address string conditional operator matches one user-defined conditional operator of the plurality of user-defined conditional operators, and the respective syntax associated with the one user-defined conditional operator of the plurality of user-defined conditional operators is used in parsing the address string;

determining, via the computing device, that the one user-defined conditional operator of the plurality of user-defined conditional operators defines a first relationship between the first address string descriptor and the second address string descriptor;

identifying, via the computing device, a first subset of one or more RWEs matching the first address string descriptor;

identifying, via the computing device, a second subset of one or more RWEs matching the second address string descriptor;

identifying, via the computing device, spatial, temporal, social and topical relationships between the each of the RWEs in the first subset and the second subset using a combined graph of data available, via a network, for RWEs and IOs known to the network;

selecting, via the computing device, one RWE of the first subset of RWEs to be the recipient RWE based on a comparison of the spatial, temporal, social and topical relationships and the first relationship; and transmitting, from the computing device over a network, the first IO to the selected recipient RWE using a unique identifier associated with the recipient RWE.

2. The method of claim 1 further comprising:

determining, via the computing device, that the one conditional operator of the plurality of user-defined conditional operators identifies a delivery condition defined by the second descriptor;

retrieving the unique identifier associated with the first descriptor; and transmitting the first IO to recipient RWE when the delivery condition is satisfied.

3. The method of claim 1 further comprising:

generating, via the computing device, based on the spatial, temporal, social and topical relationships and the first relationship, a respective probability score for each combination of RWEs from the first subset and the second subset;

selecting, via the computing device, one of the combinations of RWEs based on the respective probability score for the one of the combinations of RWEs; and selecting the recipient RWE based on the one of the combinations of RWEs.

4. The method of claim 1 further comprising:

retrieving, via the computing device, the unique identifier for the recipient RWE from a set of unique identifiers associated with the recipient RWE, such that each unique identifier in the set of unique identifiers is associated with a respective one of a plurality of communication channels and the method further comprises:

selecting, via the computing device, based on the request, a selected one of the plurality of communication channels for transmitting the first IO to the recipient RWE; and selecting, via the computing device, the unique identifier for the recipient RWE associated with the selected one of the plurality of communication channels.

5. A system comprising:

a processor connected via at least one communication channel to a plurality of computing devices transmitting information objects (IOs) over the at least one communication channel;

a storage medium for tangibly storing thereon program logic for execution by the processor, the program logic comprising:

markup language definition logic executed by the processor for defining a user-defined markup language the user-defined markup language comprising a plurality of user-defined conditional operators, each user-defined conditional operator of the plurality of user-defined conditional operators defining a respective relationship type and being associated with a respective syntax, such that the user-defined markup language is defined in response to receiving data relating to the plurality of user-defined conditional operators from a user;

request receiving logic executed by the processor for receiving, at the computing device, a request from a sender real-world entity (RWE) to deliver a first IO to a recipient RWE identified by an address string;

parsing logic executed by the processor for parsing the address string to identify at least a first address string descriptor, a second address string descriptor and an address string conditional operator, such that the address string conditional operator matches one user-defined conditional operator of the plurality of user-defined conditional operators, and the respective syntax associated with the one user-defined conditional operator of the plurality of user-defined conditional operators is used in parsing the address string;

conditional operator logic executed by the processor for determining that the one user-defined conditional operator of the plurality of user-defined conditional operators defines a first relationship between the first descriptor and the second descriptor;

RWE identification logic executed by the processor for identifying a first subset of one or more RWEs matching the first descriptor and identifying a second subset of one or more RWEs matching the second descriptor;

correlation logic executed by the processor for identifying spatial, temporal, social and topical relationships between the each of the RWEs in the first subset and the second subset using a combined graph of data available, via a network, for RWEs and IOs known to the network;

RWE selection logic executed by the processor for selecting one RWE of the first subset of RWEs to be the recipient RWE based on a comparison of the spatial, temporal, social and topical relationships and the first relationship; and IO transmission logic executed by the processor for transmitting, from the computing device over a network, the first IO to the selected recipient RWE using a unique identifier associated with the recipient RWE.

6. The system of claim 5 further comprising:

delivery logic executed by the processor for retrieving a unique communication channel address for the recipient RWE and transmitting a first IO to the unique communication channel address, the unique communication channel address being different from the address string.

7. The system of claim 6, such that the RWE selection logic further generates, based on the data spatial, temporal, social and topical relationships and the first relationship, a different respective probability score for each combination of RWEs from the first subset and the second subset, selects one of the combinations of RWEs based on the respective probability score for the one of the combinations of RWEs and selects the recipient RWE based on the selected one of the combinations of RWEs.

8. The system of claim 7 further comprising:

attribution logic executed by the processor for that identifing the sender RWE of the first IO from the data of the first IO, the owner being one of the plurality of RWEs; and such that the RWE selection logic further generates the probability for each of the plurality of RWEs based on relationships between the sender RWE and the each RWE of the first subset and the second subset.

9. The method of claim 1 such that the combined graph is a histogram of RWEs and IOs known to the network.

10. The method of claim 9 such that the histogram comprises a plurality of categories, wherein each RWE and IO are in a respective one category of a plurality of categories, and a count is assigned to each category of the plurality of categories, each count comprising a number of observations in the data available for RWEs and IOs that fall into the respective one category of the plurality of categories.

11. The method of claim 3 such that the respective probability score is determined by ascribing a weight to each respective relationship based on a predetermination of their relative importance by relationship type and strength.

12. The method of claim 1 such that the combined graph is a feature vector of RWEs known to the network.

13. The method of claim 12 such that feature vector comprises raw sensed data and higher order features relating to RWEs known to the network.

14. The method of claim 12 such that higher order features comprise contextual and periodic patterns of states and actions of RWEs known to the network.

15. The method of claim 13 such that relationships within the feature vector are identified using a learning algorithm.

16. The method of claim 15 such that the learning algorithm is selected from the list: Sparse Factor Analysis, Hidden Markov Model, Support Vector Machine, Bayesian Methods.

17. A non-transitory computer readable storage media for tangibly storing thereon computer readable instructions for a method comprising:

defining a user-defined markup language, the user-defined markup language comprising a plurality of user-defined conditional operators, each user-defined conditional operator of the plurality of user-defined conditional operators defining a respective relationship type and being associated with a respective syntax, such that the user-defined markup language is defined in response to receiving data relating to the plurality of user-defined conditional operators from a user;

receiving a request from a sender real-world entity (RWE) to deliver a first information object (IO) to a recipient RWE identified by an address string;

parsing the address string to identify at least a first address string descriptor, a second address string descriptor and an address string conditional operator, such that the address string conditional operator matches one user-defined conditional operator of the plurality of user-defined conditional operators, and the respective syntax associated with the one user-defined conditional operator of the plurality of user-defined conditional operators is used in parsing the address string;

determining that the one user-defined conditional operator of the plurality of user-defined conditional operators defines a first relationship between the first address string descriptor and the second address string descriptor;

identifying a first subset of one or more RWEs matching the first address string descriptor;

identifying a second subset of one or more RWEs matching the second address string descriptor;

identifying spatial, temporal, social and topical relationships between the each of the RWEs in the first subset and the second subset using a combined graph of data available, via a network, for RWEs and IOs known to the network;

selecting one RWE of the first subset of RWEs to be the recipient RWE based on a comparison of the spatial, temporal, social and topical relationships and the first relationship; and transmitting the first IO to the selected recipient RWE using a unique identifier associated with the recipient RWE.

* * * * *